United States Patent [19]
Nakamura et al.

[11] Patent Number: 6,122,265
[45] Date of Patent: Sep. 19, 2000

[54] SCHEME FOR WIRE LINE DATA TRANSMISSION IN MOBILE COMMUNICATION SYSTEM

[75] Inventors: Takehiro Nakamura, Yokosukashi; Katsuhiko Yamagata, Yokohamashi, both of Japan

[73] Assignee: NTT Mobile Communications Network, Inc., Tokyo, Japan

[21] Appl. No.: 08/818,683

[22] Filed: Mar. 14, 1997

[30] Foreign Application Priority Data

Mar. 19, 1996 [JP] Japan ................... P8-063067

[51] Int. Cl.[7] .................. H04J 13/00; H04Q 7/00
[52] U.S. Cl. ..................... 370/332; 370/335
[58] Field of Search ............... 370/315, 320, 370/328, 331, 332, 333, 334, 335, 338, 342; 455/436, 437, 438, 439, 442, 443, 444, 561; 375/200, 206

[56] References Cited

U.S. PATENT DOCUMENTS

| 5,267,261 | 11/1993 | Blakeney II, et al. |
| 5,408,514 | 4/1995 | Sakamoto et al. |
| 5,673,260 | 9/1997 | Umeda et al. ............ 370/342 |
| 5,771,451 | 6/1998 | Takai et al. ............. 455/442 |
| 5,790,528 | 8/1998 | Muszynski ............... 370/331 |
| 5,878,350 | 3/1999 | Nakamura et al. ......... 455/442 |
| 5,883,888 | 3/1999 | St-Pierre ............... 370/331 |
| 5,903,841 | 5/1999 | Kondo ................... 455/436 |

FOREIGN PATENT DOCUMENTS

| 0 671 819 | 9/1995 | European Pat. Off. |
| WO 93/11627 | 6/1993 | WIPO . |
| WO 95/12297 | 5/1995 | WIPO . |
| WO 96/18277 | 6/1996 | WIPO . |

OTHER PUBLICATIONS

L. Van Hauwermeiren, et al., Proceedings of the Global Telecommunications Conference, vol. 3, pp. 1691–1695, "REQUIREMENTS FOR MOBILITY SUPPORT IN ATM", Nov. 28, 1994.

M.J. McTiffin, et al., IEEE Journal on Selected Areas in Communications, vol. 12, No. 5, pp. 900–908, "MOBILE ACCESS TO AN ATM NETWORK USING A CDMA AIR INTERFACE", Jun. 1, 1994.

*Primary Examiner*—Chi H. Pham
*Assistant Examiner*—Kwang B. Yao
*Attorney, Agent, or Firm*—Oblon, Spivak, McClelland, Maier & Neustadt, P.C.

[57] ABSTRACT

A wire line data transmission scheme in a mobile communication system for reducing the wire line transmission const. Radio state qualities of a plurality of radio channels between the plurality of base stations and the mobile station are measured, and a validity and a redundancy in composition of each radio channel is judged according to the corresponding measured radio state quality. Then, a transmission in the wire line transmission paths is controlled by stopping a transmission of transmission signals for those radio channels which are judged as invalid or redundant according to the obtained judgement result. All of measuring, judging, and controlling can be carried out by each base station, or by the mobile station. Also, measuring and judging can be carried out by the mobile station while controlling is carried out by each base station, or measuring can be carried out by the mobile station while judging and controlling can be carried out by each base station.

67 Claims, 11 Drawing Sheets

# SCHEME FOR WIRE LINE DATA TRANSMISSION IN MOBILE COMMUNICATION SYSTEM

BACKGROUND OF THE INVENTION

1. Field of the Invention

The present invention relates to a scheme for wire line data transmission in a mobile communication system which can reduce wire line transmission data between a plurality o base stations and a composition station during a soft handover in a mobile communication system based on CDMA (Code Division Multiple Access) scheme, and a base station apparatus and a mobile station apparatus suitable for this scheme for wire line data transmission.

2. Description of the Background Art

In the soft handover in a mobile communication system based on CDMA scheme, as shown in FIGS. 1A and 1B, a plurality of base stations 81 and 82 are connected with a mobile station 83 on one hand, and with a composition station 84 on the other hand. For an upward transmission, as indicated in FIG. 1A, upward transmission signals duplicated at the mobile station 83 are transmitted to the composition station 84 via radio transmission paths 85 and 86, base stations 81 and 82, and wire line transmission paths 87 and 88, and then composed at the composition station 84 and transmitted to an upper level station therefrom. For a downward transmission, as indicated in FIG. 1B, downward transmission signals duplicated at the composition station 84 are transmitted to the mobile station 83 via wire line transmission paths 89 and 90, base stations 81 and 82, and radio transmission paths 91 and 92, and then composed at the mobile station 83.

Note that, for the upward radio transmission from the mobile station 83 to the base stations 81 and 82, it is possible to use either a method for transmitting separate radio channels for a plurality of base stations 81 and 82 from the mobile station 83, or a method for transmitting only a single radio channel to be received by a plurality of base stations 81 and 82 from the mobile station 83. Also, a number of base stations for carrying out the soft handover is not necessarily limited to two, and three or more base stations may be involved in the soft handover.

In the soft handover described above, a plurality of base stations are connected with the composition station through a plurality of wire line transmission paths, and as shown in FIG. 2, signals for multiple channels are transmitted through each wire line transmission path, so that there has been a problem of a high wire line transmission cost.

SUMMARY OF THE INVENTION

It is therefore an object of the present invention to provide a scheme for wire line data transmission in a mobile communication system which is capable of reducing the wire line transmission cost between each base station and the composition station at a time of the soft handover, by reducing the wire line transmission data between a plurality of base stations and the composition station in the soft handover.

It is another object of the present invention to provide a base station apparatus and a mobile station apparatus suitable for this scheme for wire line data transmission according to the present invention.

According to one aspect of the present invention there is provided a method of wire line data transmission in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; and a plurality of transmission signals from the plurality of base stations to the mobile station are composed at the mobile station; the method comprising the steps of: measuring radio state qualities of a plurality of radio channels between the plurality of base stations and the mobile station; judging a validity and a redundancy in composition of each radio channel according to a corresponding radio state quality measured at the measuring step; and controlling a transmission in the wire line transmission paths by stopping a transmission of transmission signals for those radio channels which are judged as invalid or redundant according to a judgement result obtained at the judging step.

According to another aspect of the present invention there is provided a base station apparatus for use in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; and a plurality of transmission signals from the plurality of base stations to the mobile station are composed at the mobile station; the base station apparatus comprising: a measurement circuit for measuring a radio state quality of one radio channel between the base station apparatus and the mobile station; a wire line transmission circuit for transmitting transmission signals for said one radio channel to the composition station, through one wire line transmission circuit between the base station apparatus and the composition station; and a control circuit for judging a validity and a redundancy in composition of said one radio channel according to the radio state quality measured by the measurement circuit, and controlling a transmission in said one wire line transmission path from the wire line transmission circuit by stopping a transmission of transmission signals for said one radio channel when said one radio channel is judged as invalid or redundant according to a judgement result obtained therein.

According to another aspect of the present invention there is provided a mobile station apparatus for use in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; a plurality of transmission signals from the plurality of base stations to the mobile station are composed at the mobile station; and each base station transmits transmission signals for one radio channel between said each base station and the mobile station to the composition station through one wire line transmission circuit between said each base station and the composition station; the mobile station apparatus comprising: a measurement circuit for measuring radio state qualities of a plurality of radio channels between the plurality of base stations and the mobile station; a control circuit for judging a validity and a redundancy in composition of each radio channel according to a corresponding radio state quality measured by the measurement circuit; and a transmission circuit for notifying a judgement result obtained by the control circuit to each base station, so that each base station controls a transmission in said one wire line transmission path by stopping a transmission of transmission signals for said one radio channel when said one radio channel is judged as invalid or redundant according to the judgement result obtained by the control circuit.

According to another aspect of the present invention there is provided a base station apparatus for use in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; a plurality of transmission signals from the plurality of base stations to the mobile station are composed at the mobile station; and the mobile station measures radio state qualities of a plurality of radio channels between the plurality of base stations and the mobile station, judges a validity and a redundancy in composition of each radio channel according to a corresponding measured radio state quality, and notifies a judgement result obtained therein to each base station; the base station apparatus comprising: a wire line transmission circuit for transmitting transmission signals for one radio channel between the base station apparatus and the mobile station to the composition station through one wire line transmission circuit between the base station apparatus and the composition station; and a control circuit for controlling a transmission in said one wire line transmission path from the wire line transmission circuit by stopping a transmission of transmission signals for said one radio channel when said one radio channel is judged as invalid or redundant according to the judgement result notified from the mobile station.

According to another aspect of the present invention there is provided a base station apparatus for use in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; a plurality of transmission signals from the plurality of base stations to the mobile station are composed at the mobile station; and the mobile station measures radio state qualities of a plurality of radio channels between the plurality of base stations and the mobile station and notifies a measured radio state quality of a radio channel between each base station and the mobile station to each base station; the base station apparatus comprising: a wire line transmission circuit for transmitting transmission signals for one radio channel between the base station apparatus and the mobile station to the composition station, through one wire line transmission circuit between the base station apparatus and the composition station; and a control circuit for judging a validity and a redundancy in composition of said one radio channel according to the radio state quality notified from the mobile station, and controlling a transmission in said one wire line transmission path from the wire line transmission circuit by stopping a transmission of transmission signals for said one radio channel when said one radio channel is judged as invalid or redundant according to a judgement result obtained therein.

Other features and advantages of the present invention will become apparent from the following description taken in conjunction with the accompanying drawings.

DETAILED DESCRIPTION OF THE PREFERRED EMBODIMENTS

Figure 1B:
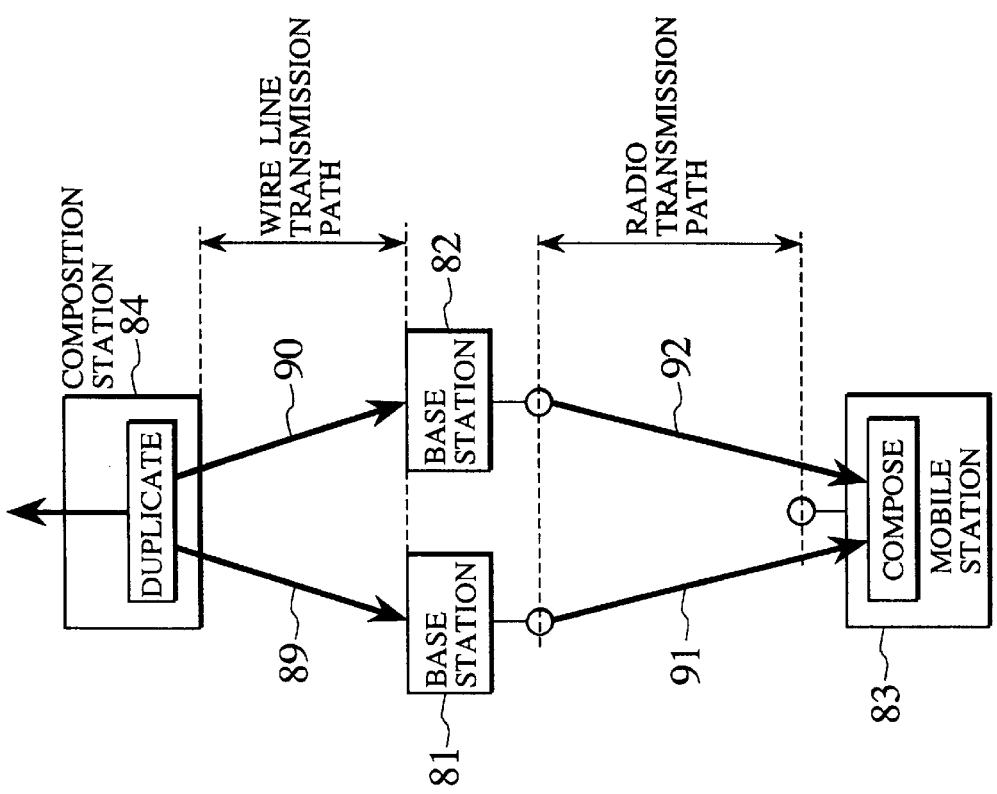
FIGS. 1A and 1B are schematic block diagrams for explaining a soft handover in a conventional mobile communication system.
Figure 1A:
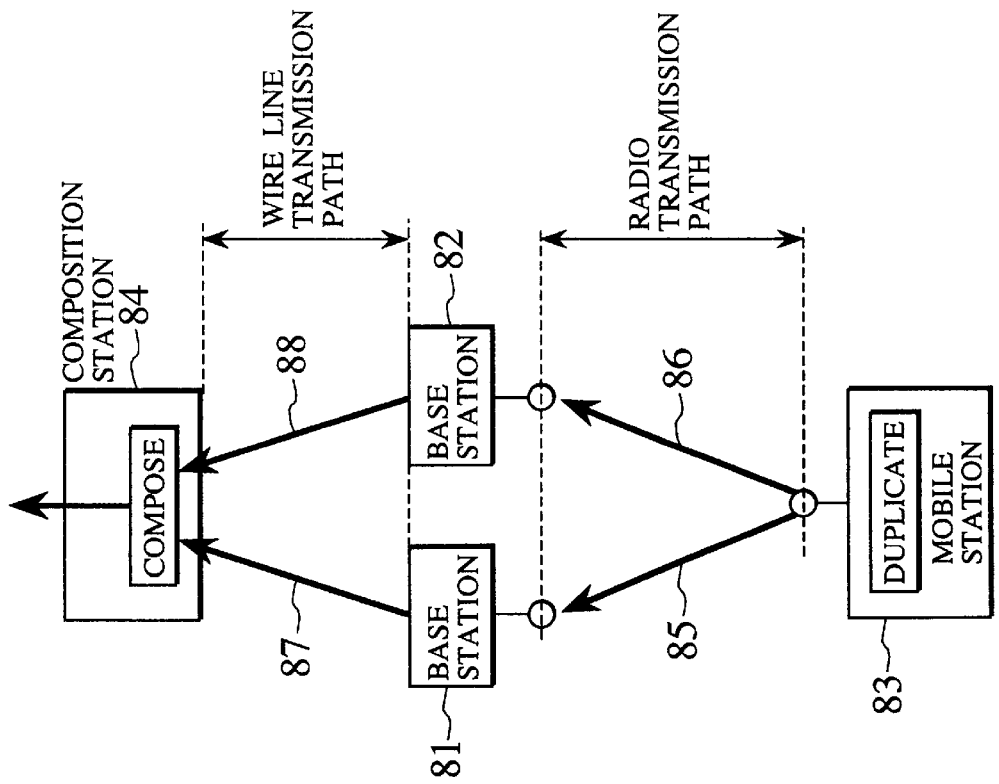
Figure 2:
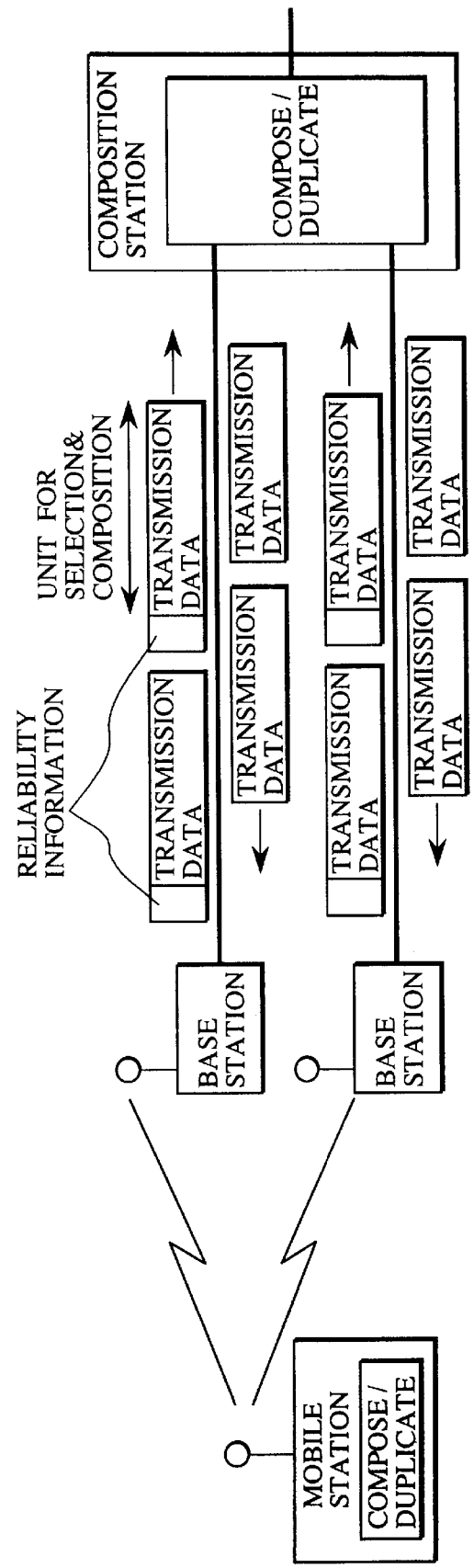
FIG. 2 is a schematic block diagram for explaining a wire line data transmission in a conventional mobile communication system.

First, the general features of a scheme for wire line data transmission in a mobile communication system according to the present invention will be summarized briefly.

The wire line data transmission scheme of the present invention aims to reduce the wire line transmission cost by reducing an amount of transmission signals in a plurality of wire line transmission paths connecting a plurality of base stations and a composition station at a time of the soft handover in the mobile communication system based on CDMA scheme. To this end, the present Invention proposes to construct the wire line transmission paths from packet transmission paths such as frame relay transmission paths, ATM transmission paths, and/or packet transmission paths according to ITU-T X.25 protocol, so as to reduce an amount of transmission signals and thereby realize a reduced wire line transmission cost.

Namely, in a case of using line exchange transmission paths, the wire lines are fixedly allocated so that the wire line transmission cost is unchanged even if an amount of transmission signals is reduced. In contrast, in a case of using packet transmission paths, the reduction of an amount of transmission signals leads to the reduction of average traffic amount and peak traffic amount, so that a number of multiplexed virtual channels that can be set up in the wire line transmission paths can be increased and therefore it is possible to realize a reduced wire line transmission cost.

In the wire line data transmission scheme of the present invention, radio state qualities of radio channels between a plurality of base stations and a mobile station are measured and radio states are judged from the measured values. Then, when a radio state of some radio channel is judged as poor, the transmission in a wire line transmission path corresponding to this radio channel with a poor radio state is stopped because this radio channel is expected to be not useful in the composition processing. In addition, when there exists a radio channel with a quite good radio state, the other radio channels are expected to be redundant in the composition processing, so that the transmission in wire line transmission paths corresponding to these redundant radio channels are also stopped.

The wire line data transmission scheme of the present invention can be realized in various embodiments depending on where the measurement of the radio state qualities, the judgement of the radio states, and the stopping of the transmission in the wire line transmission paths are to be carried out. For instance, all of these operations can be carried out by a base station or by a mobile station, or else the measurement operation alone can be carried out by a mobile station while the judgement operation is carried out by a base station. Note that a series of processing formed by these measurement, judgement, and stopping operations is to be carried out for each unit of composition because the radio environment generally varies in time. In the following, a case of carrying out all these operations at a base station will be described first.

Figure 3:
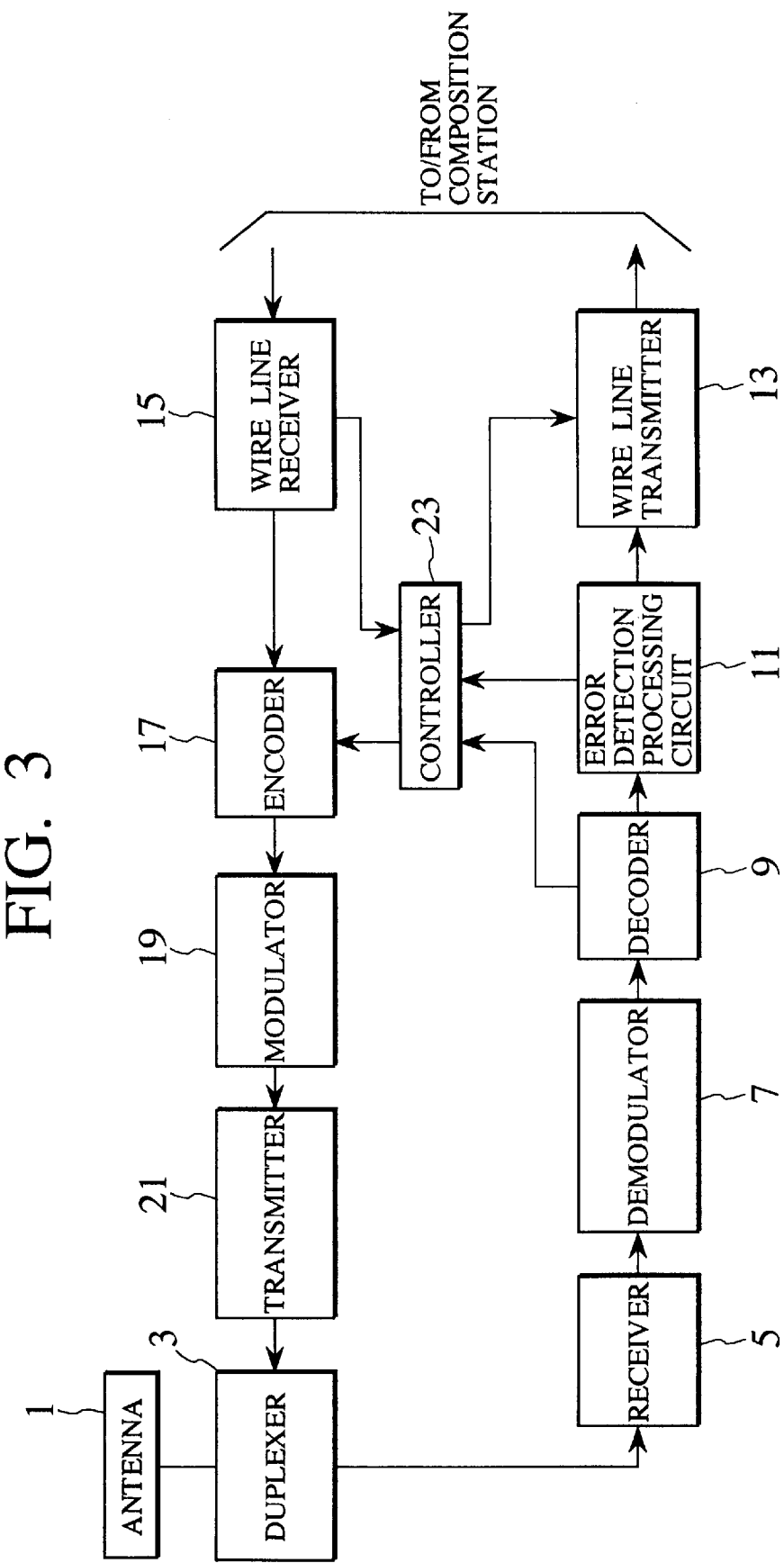
FIG. 3 is a block diagram of a base station apparatus in the first embodiment of a scheme for wire line data transmission according to the present invention.
Figure 4:
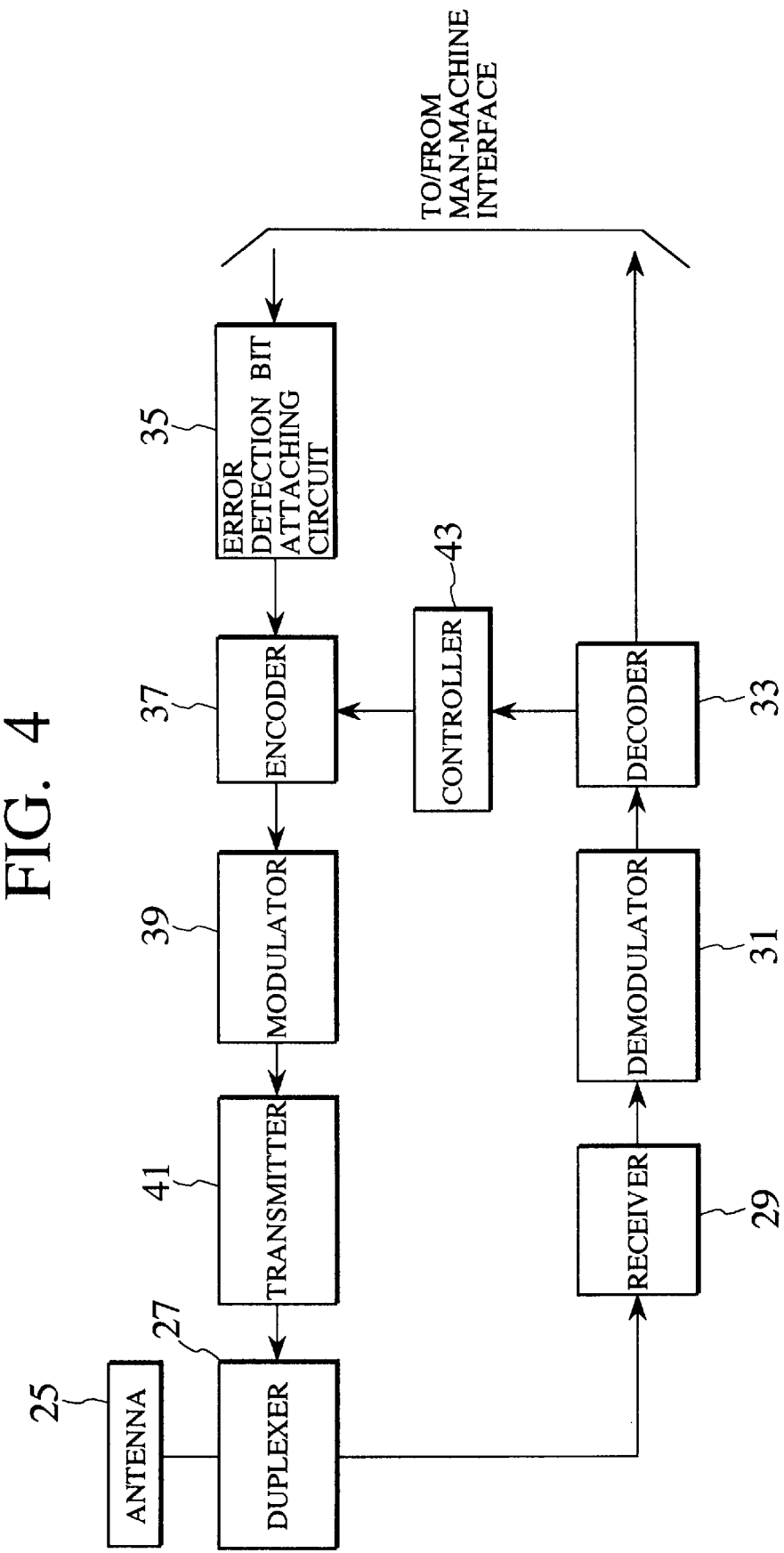
FIG. 4 is a block diagram of a mobile station apparatus in the first embodiment of a scheme for wire line data transmission according to the present invention.
Figure 5:
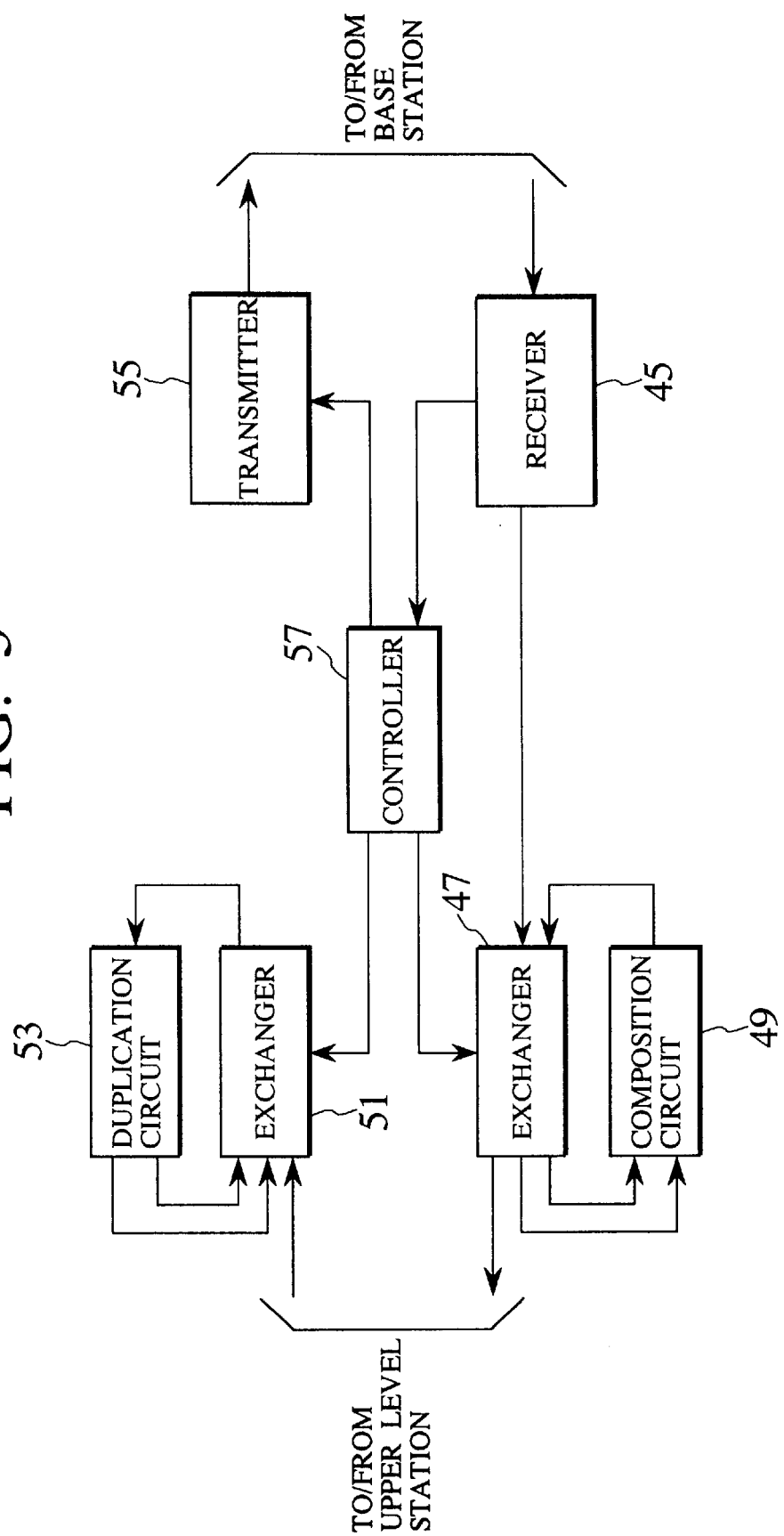
FIG. 5 is a block diagram of a composition station apparatus in the first embodiment of a scheme for wire line data transmission according to the present invention.

Referring now to FIG. 3 to FIG. 5, the first embodiment of a scheme for wire line data transmission in a mobile communication system according to the present invention will be described in detail.

FIG. 3 shows a configuration of a base station apparatus for realizing the wire line data transmission scheme in the first embodiment of the present invention, FIG. 4 shows a configuration of a mobile station apparatus to be used in conjunction with the base station apparatus of FIG. 3, and FIG. 5 shows a composition station apparatus to be used in conjunction with the base station apparatus of FIG. 3 and the mobile station apparatus of FIG. 4.

In this first embodiment, the base station uses a result of the error detection such as CRC check or parity check as the radio state quality to be measured, so that the base station apparatus of FIG. 3 has an error detection processing circuit 11 for this purpose. In addition, in order to enable this error detection processing, the mobile station apparatus of FIG. 4 has an error detection bit attaching circuit 35 so that transmission signals given from a man-machine interface are transmitted while error detection bits are attached thereto using this error detection bit attaching circuit 35.

The base station apparatus of FIG. 3 has an antenna 1 for receiving radio signals from a mobile station, and the radio signals received by the antenna 1 are supplied to a demodulator 17 via a duplexer 3 and a receiver 5. At the demodulator 17, the despreading using the spread code and the usual demodulation are carried out, and the demodulated signals are supplied to a decoder 9. At the decoder 9, the decoding of transmission signals and control signals is carried out, and the control signals are supplied to a controller 23 while the transmission signals are supplied to the error detection processing circuit 11.

The error detection processing circuit 11 carries out the error detection using the error detection bits contained in the transmission signals, and supplies the error detection result to the controller 23, while the transmission signals with the error detection bits removed therefrom are supplied to a wire line transmitter 13.

The wire line transmitter 13 encodes the transmission signals given from the error detection processing circuit 11 and the control signals given from the controller 23, assemble packets from them, and transmits the packets to a composition station through an uplink wire line transmission path. Here, the stopping and the restart of the transmission of the transmission signals to be transmitted to the wire line transmission path via the wire line transmitter 13 are controlled by commands from the controller 23.

On the other hand, packet signals received from a composition station through the wire line transmission path are received by a wire line receiver 15. At the wire line receiver 15, the received packet signals are decomposed and separated into the transmission signals and the control signals, and the transmission signals are supplied to an encoder 17, while the control signals are supplied to the controller 23.

The encoder 17 encodes the transmission signals given from the wire line receiver 15 and the control signals given from the controller 23, and supplies the encoded signals to a modulator 19. At the modulator 19, the encoded transmission signals given from the encoder 17 are subjected to the primary modulation, and then to the spread modulation using the spread code. The modulated transmission signals are then transmitted toward a mobile station from the antenna 1 via a transmitter 21 and the duplexer 3.

The controller 23 controls the overall operation of the base station while receiving the error detection result from the error detection processing circuit 11, and when a notice for a detection of an error is received or when a state of receiving a notice for a detection of an error is continued over a prescribed period of time, the controller 23 issues a command for stopping the transmission of the transmission signals to the wire line transmission path, with respect to the wire line transmitter 13. Thereafter, when a notice for a detection of no error is received or when a state of receiving a notice for a detection of no error is continued over a prescribed period of time, the controller issues a command for restarting the transmission of the transmission signals to the wire line transmission path, with respect to the wire line transmitter 13.

In addition, when a notice for a detection of an error is received from the error detection processing circuit 11 or when a state of receiving a notice for a detection of an error is continued over a prescribed period of time, the controller 23 generates a control signal for commanding the stopping of the transmission of the transmission signals to the downlink wire line transmission with respect to the composition station, and sends this control signal to the wire line transmitter 13. Thereafter, when a notice for a detection of no error is received from the error detection processing circuit 11 or when a state of receiving a notice for a detection of no error is continued over a prescribed period of time, the controller generates a control signal for commanding the restart of the transmission of the transmission signals to the downlink wire line transmission path with respect to the composition station, and sends this control signal to the wire line transmitter 13.

The mobile station apparatus of FIG. 4 has an antenna 25 for receiving radio signals from a base station, and the radio signals received from a base station by the antenna 25 are supplied to a demodulator 31 via a duplexer 27 and a receiver 29. At the demodulator 31, the despreading using the spread code and the usual demodulation are carried out, and the demodulated signals are supplied to a decoder 33. At the decoder 33, the decoding of transmission signals and control signals is carried out, and the control signals are supplied to a controller 43 while the transmission signals are supplied to a man-machine interface.

On the other hand, the transmission signals such as speech signals from the man-machine interface are supplied to the error detection bit attaching circuit 35. At the error detection bit attaching circuit 35, the transmission signals are divided into signal units with a constant signal length and the error detection bit is attached to each divided signal unit, and then the transmission signals with the error detection bits attached are supplied to an encoder 37.

The encoder 37 encodes the transmission signals given from the error detection bit attaching circuit 35 and the control signals given from the controller 43, and supplies the encoded signals to a modulator 39. At the modulator 39, the encoded transmission signals given from the encoder 37 are subjected to the primary modulation, and then to the spread modulation using the spread code. The modulated transmission signals are then transmitted toward a base station from the antenna 25 via a transmitter 41 and the duplexer 27.

The composition station apparatus of FIG. 5 has a receiver 45 connected with base stations through an uplink wire line transmission path and a transmitter 55 connected with base stations through a downlink wire line transmission path. At the receiver 45, packets received from a plurality of base stations via the uplink wire line transmission path are decomposed and separated into the transmission signals and the control signals, and the transmission signals are supplied to an exchanger 47 while the control signals are supplied to a controller 57. The exchanger 47 carries out the switching of the transmission signals according to commands from the controller 57, supplies a plurality of upward transmission signals to be composed together received by the receiver 45 to a composition circuit 49, and transmits the composed upward transmission signals given from the composition circuit 49 toward an upper level station.

On the other hand, when downward transmission signals are received from the upper level station, an exchanger 51 carries out the switching of the transmission signals according to commands from the controller 57, supplies the downward transmission signals to be used in the soft handover to a duplication circuit 53, and sends the duplicated downward transmission signals to the transmitter 55.

The transmitter 55 encodes the downward transmission signals given from the exchanger 51 and the control signals given from the controller 57 and assembles packets, and transmits the packets toward base stations via the downlink wire line transmission path. In addition, the transmitter 55 carries out the stopping or restart of the transmission through the wire line transmission path specified from the controller 57, according to the stopping or restart command for the downlink wire line transmission given from the controller 57.

The controller 57 controls the overall operation of the composition station, and according to the stopping or restart command for the downlink wire line transmission received among the control signals received from the base stations by the receiver 45, the controller 57 specifies the corresponding wire line transmission path to the transmitter 55 and commands the stopping or restart of the transmission of the transmission signals through that wire line transmission path.

With the base station apparatus, the mobile station apparatus, and the composition station apparatus in these configurations, when a mobile station moves between a plurality of cells, this mobile station is set in the soft handover state in which this mobile station is connected to the composition station via a plurality of base stations with which this mobile station is simultaneously connected. In this soft handover state, the error detection bits are attached to the transmission signals such as speech signals from the man-machine interface of this mobile station by the error detection bit attaching circuit 35, and these transmission signals are encoded along with the control signals from the controller 43 by the encoder 37, then demodulated by the demodulator 39, and transmitted toward a plurality of base stations from the antenna 25 via the transmitter 41 and the duplexer 27.

Each of these plurality of base stations receives the transmission signals from the mobile station by the antenna 1, and supplies the received transmission signals to the demodulator 7 via the duplexer 3 and the receiver 5. The modulator 7 then demodulates the transmission signals from the mobile station, and supplies the demodulated transmission signals to the error detection processing circuit 11.

The error detection processing circuit 11 carries out the error detection using the error detection bits contained in the transmission signals, and outputs the error detection result as the judgement result of the validity of the transmission signals from the mobile station. This judgement result obtained at the error detection processing circuit 11 indicates whether there is an error in the transmission signals or not, and this error detection result is notified to the controller 23.

The controller 23 receives the error detection result from the error detection processing circuit 11, and when a notice for a detection of an error is received or when a state of receiving a notice for a detection of an error is continued over a prescribed period of time, the controller 43 commands the wire line transmitter 13 to stop the transmission of the transmission signals to the wire line transmission path. Thereafter, when a notice for a detection of no error is received or when a state of receiving a notice for a detection of no error is continued over a prescribed period of time, the controller 43 commands the wire line transmitter 13 to restart the transmission of the transmission signals to the wire line transmission path.

Also, when a notice for a detection of an error is received from the error detection processing circuit 11 or when a state of receiving a notice for a detection of an error is continued over a prescribed period of time, the controller 23 generates a control signal for commanding the composition station to stop the downlink wire line transmission, and sends this control signal to the wire line transmitter 13, so that this control signal is notified to the composition station via the wire line transmission path. Here, this notification to the composition station can be made either when each error detection result is obtained by the error detection processing circuit 11, that is, when each judgement result for the validity of the transmission signals is obtained, or only when the judgement result is changed.

Thereafter, when a notice for a detection of no error is received from the error detection processing circuit 11 or when a state of receiving a notice for a detection of no error is continued over a prescribed period of time, the controller 23 generates a control signal for commanding the composition station to restart the transmission of the transmission signals to the downlink wire line transmission path, and sends this control signal to the wire line transmitter 13.

Next, the second embodiment of a scheme for wire line data transmission in a mobile communication system according to the present invention will be described in detail.

As described in the first embodiment, while the transmission of the upward transmission signals to the wire line transmission path via the wire line transmitter 13 is stopped by the control from the controller 23 of the base station, the composition station is in a state of not being able to receive the upward transmission signals. In this second embodiment, the composition station monitors this state at the controller 57 via the receiver 45, and when this state is continued over a prescribed period of time, the controller 57 commands the transmitter 55 to stop the transmission of the downward transmission signals via the downlink wire line transmission path, so that the transmission of the downward transmission signals are also stopped. Then, afterwards, when the transmission signals are received from the uplink wire line transmission path over a prescribed period of time, the transmission in the downlink wire line transmission path is restarted.

This control by the controller 57 is base on an assumption that, when the uplink radio channel has a poor radio state quality, the downlink radio channel also has a similarly poor radio state quality. In general, possible radio section variations include a long section variation, a short section variation, and an instantaneous variation, and for the long section variation and the short section variation, the uplink radio channel state and the downlink radio channel state have one-to-one correlation relationship, so that when the radio state quality for the uplink radio channel is poor, it can be judged that the radio state quality for the downlink radio channel is also poor. For this reason, the transmission of the downward transmission signals in the downlink wire line transmission path is stopped according to the uplink radio channel state in this second embodiment.

The rest of this second embodiment is substantially the same as the first embodiment described above.

Figure 6:
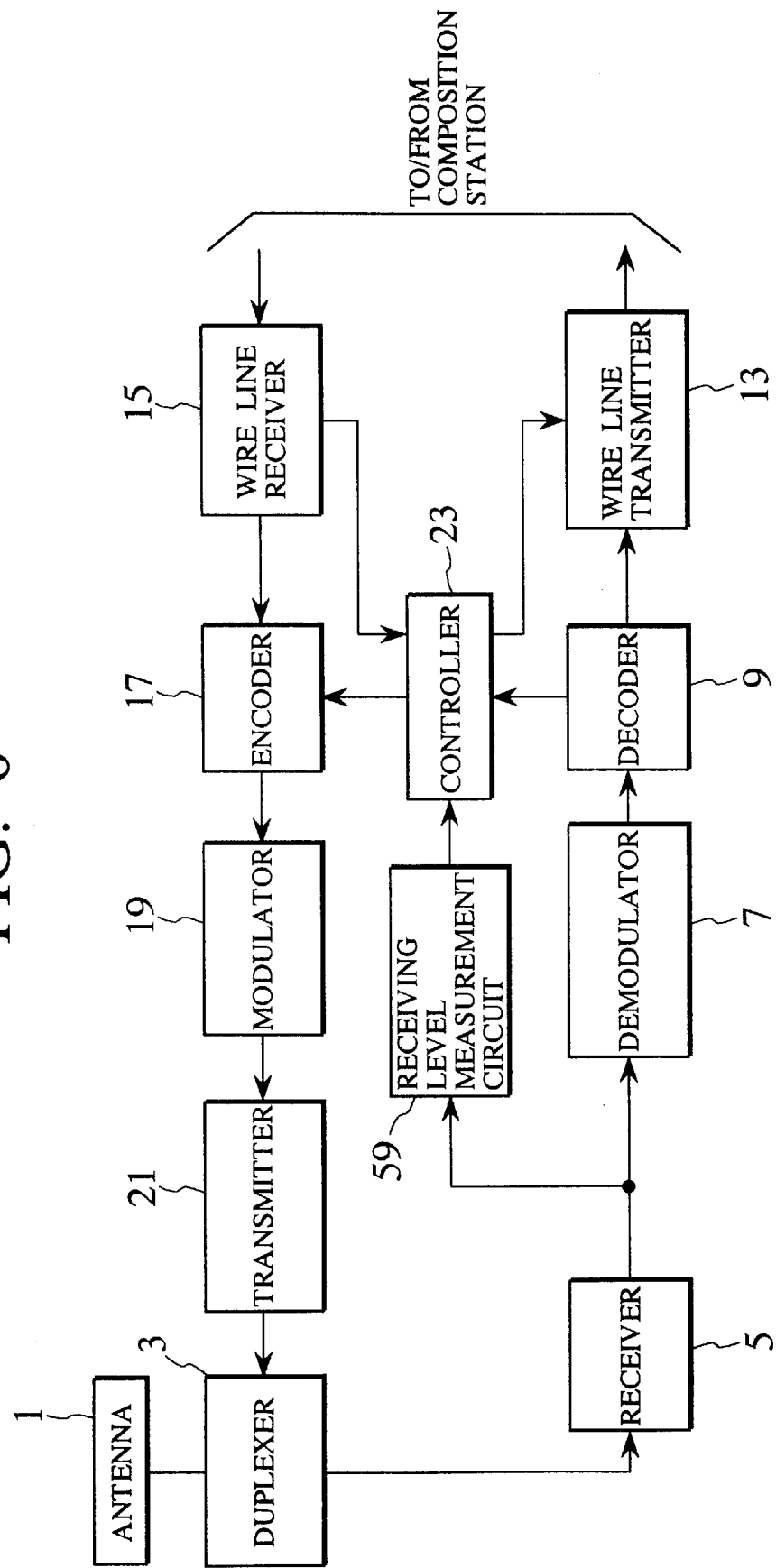
FIG. 6 is a block diagram of a base station apparatus in the third embodiment of a scheme for wire line data transmission according to the present invention.

Referring now to FIG. 6, the third embodiment of a scheme for wire line data transmission in a mobile communication system according to the present invention will be described in detail.

FIG. 6 shows a configuration of a base station apparatus for realizing the wire line data transmission scheme in the third embodiment of the present invention. This base station apparatus of FIG. 6 uses a desired signal receiving level, that is, a receiving level of a desired target signal other than the interference noise, as the radio state quality to be measured. To this end, this base station apparatus of FIG. 6 differs from the base station apparatus of FIG. 3 in that a receiving level measurement circuit 59 is incorporated while the error detection processing circuit 11 of FIG. 3 is omitted, and a function of the controller 23 is changed in relation to the incorporation of the receiving level measurement circuit 59. The rest of the configuration and the operation of this base station apparatus of FIG. 6 are the same as those of FIG. 3.

Also, in this third embodiment, the configuration of the mobile station apparatus is the same as that of FIG. 4. Here, the error detection bit attaching circuit 35 may be provided as in FIG. 4, even though it is not utilized in this third embodiment. Also, in this third embodiment, the configuration of the composition station apparatus is the same as that of FIG. 5.

In the base station apparatus of FIG. 6, the receiving level measurement circuit 59 measures the receiving level of the radio channel received from the mobile station, and notifies the measured value to the controller 23. The controller 23 receives the measured value from the receiving level measurement circuit 59, and when the measured value is lower than a prescribed value or when the measured value is continuously lower than a prescribed value over a prescribed period of time, the controller 23 commands the wire line transmitter 13 to stop the transmission of the transmission signals to the wire line transmission path. Thereafter, when the measured value becomes not lower than a prescribed value or when the measured value becomes continuously not lower than a prescribed value over a prescribed period of time, the controller 23 commands the wire line transmitter 13 to restart the transmission of the transmission signals to the wire line transmission path.

While the transmission of the upward transmission signals to the wire line transmission path via the wire line transmitter 13 is stopped, the composition station is in as state of not being able to receive the upward transmission signals. The composition station monitors this state, and stops the transmission of the downward transmission signals as well, similarly as in the second embodiment.

Also, in this third embodiment, when the measured value from the receiving level measurement circuit 59 is lower than a prescribed value or when the measured value is continuously lower than a prescribed value over a prescribed period of time, the controller 23 generates a control signal for commanding the composition station to stop the downlink wire line transmission, and sends this control signal to the wire line transmitter 13.

Thereafter, when the measured value from the receiving level measurement circuit 59 becomes not lower than a prescribed value or when the measured value becomes continuously not lower than a prescribed value for a prescribed period of time, the controller 23 generates a control signal for commanding the composition station to restart the transmission of the transmission signals to the downlink wire line transmission path, and sends this control signal to the wire line transmitter 13.

Next, the fourth embodiment of a scheme for wire line data transmission in a mobile communication system according to the present invention will be described in detail.

In this fourth embodiment, the base station apparatus of FIG. 6 is slightly modified to incorporate a receiving SIR measurement circuit for measuring a receiving SIR value which is a ratio of the desired signal receiving level and the interference receiving level, instead of the receiving level measurement circuit 59 for measuring the desired signal receiving level in the base station apparatus of FIG. 6. The rest of this fourth embodiment is the same as the third embodiment.

With this modified configuration of the base station apparatus, the transmission control in the wire line transmission path can be carried out similarly as in the third embodiment described above.

Figure 7:
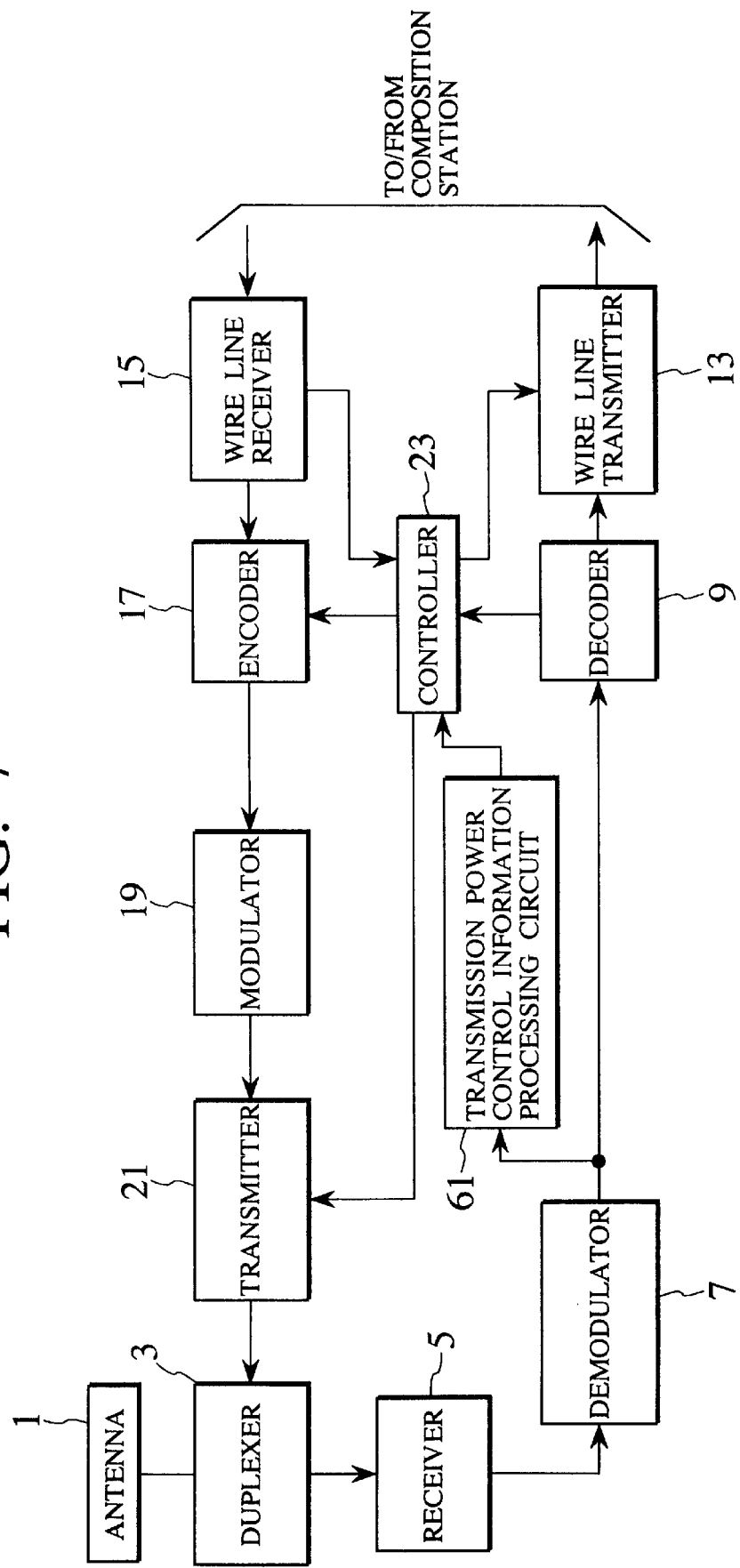
FIG. 7 is a block diagram of a base station apparatus in the fifth embodiment of a scheme for wire line data transmission according to the present invention.

Referring now to FIG. 7, the fifth embodiment of a scheme for wire line data transmission in a mobile communication system according to the present invention will be described in detail.

FIG. 7 shows a configuration of a base station apparatus for realizing the wire line data transmission scheme in the fifth embodiment of the present invention. This base station apparatus of FIG. 7 uses a transmission power changing command frequency in the transmission power control information as the radio state quality to be measured. To this end, this base station apparatus of FIG. 7 differs from the base station apparatus of FIG. 6 in that a transmission power control information processing circuit 61 is incorporated while the receiving level measurement circuit 59 of FIG. 6 is omitted, and a function of the controller 23 is changed in relation to the incorporation of the transmission power control information processing circuit 61. The rest of the configuration and the operation of this base station apparatus of FIG. 7 are the same as those of FIG. 6.

Also, in this fifth embodiment, the configuration of the mobile station apparatus is the same as that of FIG. 4, except that a transmission power control information processing circuit is added in order to transmit the transmission power control information to the base station. Here, the error detection bit attaching circuit 35 may be provided as in FIG. 4, even though it is not utilized in this fifth embodiment. Also, in this fifth embodiment, the configuration of the composition station apparatus is the same as that of FIG. 5.

In the base station apparatus of FIG. 7, the transmission power control information processing circuit 61 extracts the transmission power control information from the upward radio channel signals demodulated by the demodulator 7, and supplies the extracted transmission power control information to the controller 23.

Then, the controller 23 specifies the transmission power value to the transmitter 21 according to the transmission power control information received from the. transmission power control information processing circuit 61, while measuring a frequency for which the transmission power control information commands the raise of the transmission power, that is, the transmission power raising command frequency, and when this measured value is greater than a prescribed value, that is, in a case where a command to raise the transmission power because of the low receiving level is issued frequently, it implies that the radio state quality is poor, so that the controller 23 commands the wire line transmitter 13 to stop the transmission of the transmission signals to the wire line transmission path. Thereafter, when the measured value of the transmission power changing command frequency becomes not greater than a prescribed value, the controller 23 commands the wire line transmitter 13 to restart the transmission of the transmission signals to the wire line transmission path.

In addition, when the measured value of the transmission power changing command frequency is greater than a prescribed value, the controller 23 generates a control signal for commanding the composition station to stop the downlink wire line transmission, and sends this control signal to the wire line transmitter 13.

Thereafter, when the measured value of the transmission power changing command frequency becomes not greater than a prescribed value, the controller 23 generates a control signal for commanding the composition station to restart the transmission of the transmission signals to the downlink wire line transmission path, and sends this control signal to the wire line transmitter 13.

Next, the sixth embodiment of a scheme for wire line data transmission in a mobile communication system according to the present invention will be described in detail.

In this sixth embodiment, the transmission power changing command frequency in the transmission power control is used as the radio state quality similarly as in the fifth embodiment, but the fifth embodiment described above is slightly modified as follows.

Namely, in this sixth embodiment, in a case of using the transmission power lowering command frequency in a plurality of radio channels as the radio state quality to be measured, when there is a certain radio channel for which the measured value is greater than a first prescribed value X, the transmission in the wire line transmission path for the transmission signals of those radio channels for which the measured value is less than a second prescribed value Y is stopped among the radio channels other than that certain radio channel, where the second prescribed value Y is less than the first prescribed value X, and when there is no radio channel for which the measured value is greater than the first prescribed value X, the transmission in the wire line transmission path for the transmission signals of those radio channels for which the measured value is less than a third prescribed value Z is stopped, where the third prescribed value Z is less than the second prescribed value Y.

Also, in a case of using the transmission power raising command frequency in the transmission power control as the radio state quality to be measured, when there is a certain radio channel for which the measured value is less than the first prescribed value U, the transmission in the wire line transmission path for the transmission signals of those radio channels for which the measured value is greater than a second prescribed value V is stopped among the radio channels other than that certain radio channel, where the second prescribed value V is greater than the first prescribed value U, and when there is no radio channel for which the measured value is less than the first prescribed value U, the transmission in the wire line transmission path for the transmission signals of those radio channels for which the measured value is greater than a third prescribed value W is stopped, where the third prescribed value W is greater than the second prescribed value V.

In this manner, it becomes easier to stop the transmission in the wire line transmission path when there is a radio channel for which the measured value is better than the first prescribed value X or U, while it becomes harder to stop the transmission in the wire line transmission path when there is no radio channel for which the measured value is better than the first prescribed value X or U.

Note here that the first, second and third prescribed values X, Y and Z used in a case of using the transmission power lowering command frequency are not necessarily the same as the first, second and third prescribed values U, V and W used in a case of using the transmission power raising command frequency.

Note also that, when the error detection result, the desired signal receiving level, or the receiving SIR value is used as the radio state quality to be measured as in the first to fourth embodiments described above, each base station carries out the measurement, judgement, and control with respect to one radio channel received at that base station alone.

In contrast, when the transmission power changing command frequency is used as the radio state quality to be measured as in the fifth and sixth embodiments described above, each base station can carry out the measurement, judgement, and control with respect to all radio channels related to the soft handover. Namely, during the soft handover, the mobile station receives a plurality of downlink radio channels, so that it is possible for the mobile station to set a plurality of transmission power control information for these plurality of radio channels in the uplink radio channel, and in such a case, each base station can receive the transmission power control information for the other radio channels related to the soft handover which are not received by that base station. Thus, by transmitting the transmission power control information for all downlink radio channels in the uplink radio channel from the mobile station, it is possible for each base station to carry out the measurement, judgement, and control with respect to all radio channels related to the soft handover.

Figure 8:
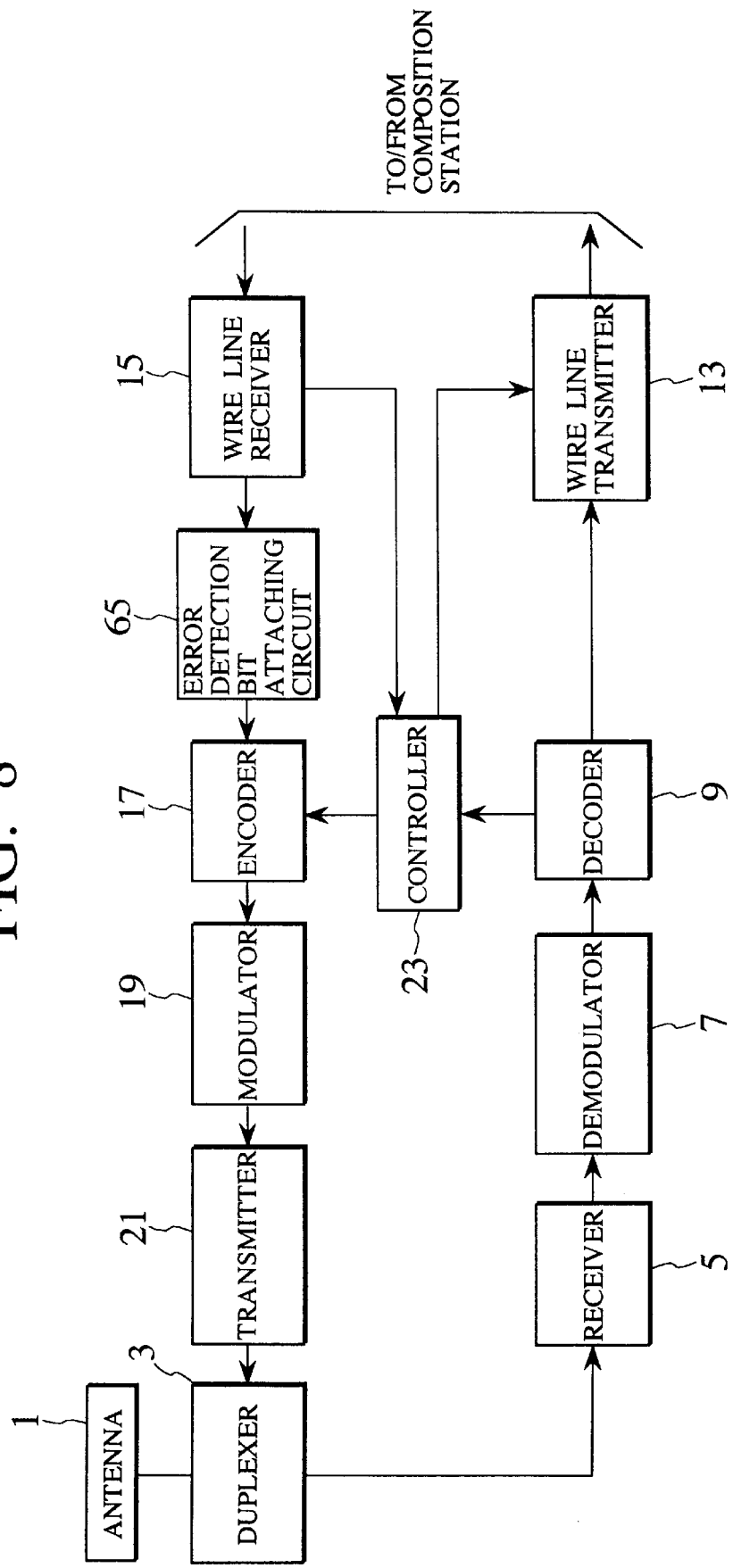
FIG. 8 is a block diagram of a base station apparatus in the seventh embodiment of a scheme for wire line data transmission according to the present invention.
Figure 9:
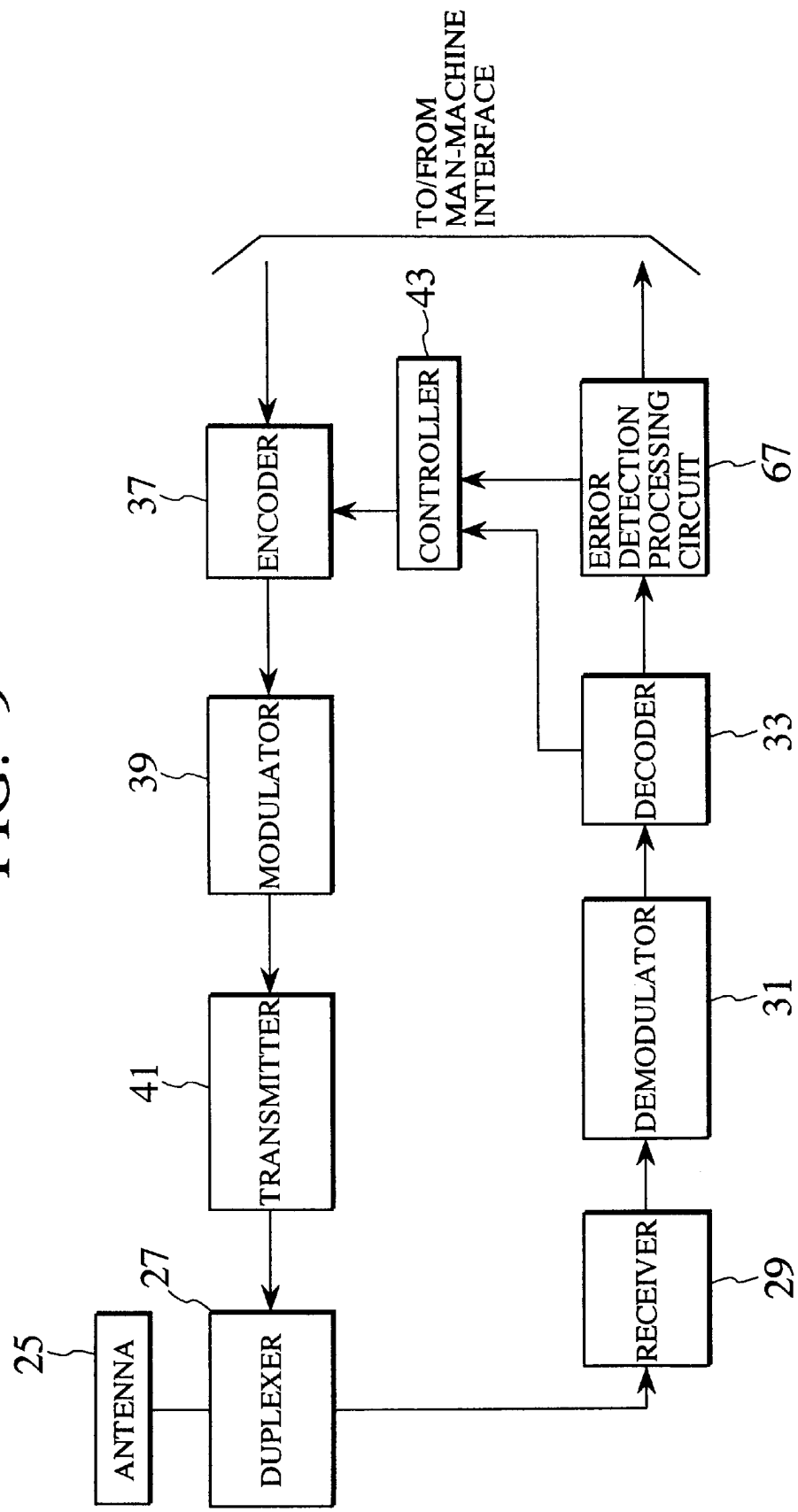
FIG. 9 is a block diagram of a mobile station apparatus in the seventh embodiment of a scheme for wire line data transmission according to the present invention.

Referring now to FIG. 8 and FIG. 9, the seventh embodiment of a scheme for wire line data transmission in a mobile communication system according to the present invention will be described in detail.

FIG. 8 shows a configuration of a base station apparatus for realizing the wire line data transmission scheme in the seventh embodiment of the present invention, and FIG. 9 shows a configuration of a mobile station apparatus to be used in conjunction with the base station apparatus of FIG. 8.

In this seventh embodiment, the measurement and the judgement of the radio state quality are carried out at a mobile station while the error detection result is used as the radio state quality to be measured. To this end, the base station apparatus of FIG. 8 differs from the base station apparatus of FIG. 3 in that an error detection bit attaching circuit 65 is incorporated while the error detection processing circuit 11 of FIG. 3 is omitted, and the mobile station apparatus of FIG. 9 differs from the mobile station apparatus of FIG. 4 in that an error detection processing circuit 67 is incorporated while the error detection bit attaching circuit 35 of FIG. 4 is omitted. The rest of the configuration and the operation of the base station apparatus of FIG. 8 and the mobile station apparatus of FIG. 9 are the same as those of FIG. 3 and FIG. 4, respectively. Also, in this seventh embodiment, the configuration of the composition station apparatus is the same as that of FIG. 5.

With the base station apparatus, the mobile station apparatus, and the composition station apparatus in these configurations, when a mobile station moves between a plurality of cells, this mobile station is set in the soft handover state in which this mobile station is connected to the composition station via a plurality of base stations with which this mobile station is simultaneously connected. In this soft handover state, the transmission signals from the composition station are received by the wire line receiver 15 of each base station and supplied from the wire line receiver 15 to the error detection bit attaching circuit 65. Then, the error detection bits are attached to the transmission signals by the error detection bit attaching circuit 65, and these transmission signals are encoded along with the control signals from the controller 23 by the encoder 17, then demodulated by the demodulator 19, and transmitted toward the mobile station from the antenna 1 via the transmitter 21 and the duplexer 3.

The mobile station receives the transmission signals from each base station by the antenna 25, and supplies the received transmission signals to the demodulator 31 via the duplexer 27 and the receiver 29. The modulator 31 then demodulates the transmission signals from each base station, and supplies the demodulated transmission signals to the error detection processing circuit 67.

The error detection processing circuit 67 carries out the error detection using the error detection bits contained in the transmission signals, and supplies the error detection result to the controller 43 as the judgement result of the validity of the transmission signals from each base station, while supplying the transmission signals with the error detection bits removed therefrom to the man-machine interface.

Note here that the error detection result outputted by the error detection processing circuit 67 is directly utilized as the judgement result in the above description, but instead of this, it is also possible for the controller 43 to receive the error detection result from the error detection processing circuit 67, measure the frequency by which an error is detected within a prescribed period of time, checks whether the transmission signals from each base station has a valid quality or not, whether the transmission signals from each base station are redundant or not, etc., and utilize this checking result as the judgement result, and it should be understood that the judgement result referred to in the above description is intended to cover such a modified case as well.

The controller supplies this judgement result to the encoder 37 as a control signal with respect to the base station, and the encoder 37 encodes control signals including this judgement result along with the transmission signals from the man-machine interface. Then, the encoded transmission signals and control signals are transmitted toward the base station from the antenna 25 via the modulator 39, the transmitter 41, and the duplexer 27.

The base station receives these transmission signals and control signals transmitted from the mobile station by the antenna 1, and supplies these transmission signals and control signals to the decoder 9 via the duplexer 3, the receiver 5, and the demodulator 7. The decoder 9 decodes the transmission signals and the control signals including the judgement result, and supplies the control signals to the controller 23 while the transmission signals are supplied to the wire line transmitter 13.

The controller 23 then commands the wire line transmitter 13 to stop or restart the transmission of the transmission signals to the wire line transmission path according to the judgement result obtained from the mobile station which is contained in the control signals. Here, the controller 23 also generates a control signal with respect to the composition station and notifies this control signal to the composition station via the wire line transmitter 13 either when each judgement result is obtained, or only when the judgement result is changed.

Also, in this seventh embodiment, as described above, while the transmission of the upward transmission signals to the wire line transmission path via the wire line transmitter 13 is stopped by the control from the controller 23 of the base station, the composition station is in a state of not being able to receive the upward transmission signals, and the composition station monitors this state at the controller 57 via the receiver 45, and when this state is continued over a prescribed period of time, the controller 57 commands the transmitter 55 to stop the transmission of the downward transmission signals via the downlink wire line transmission path, so that the transmission of the downward transmission signals are also stopped. Then, afterwards, when the transmission signals are received from the uplink wire line transmission path over a prescribed period of time, the transmission in the downlink wire line transmission path is restarted.

Figure 10:
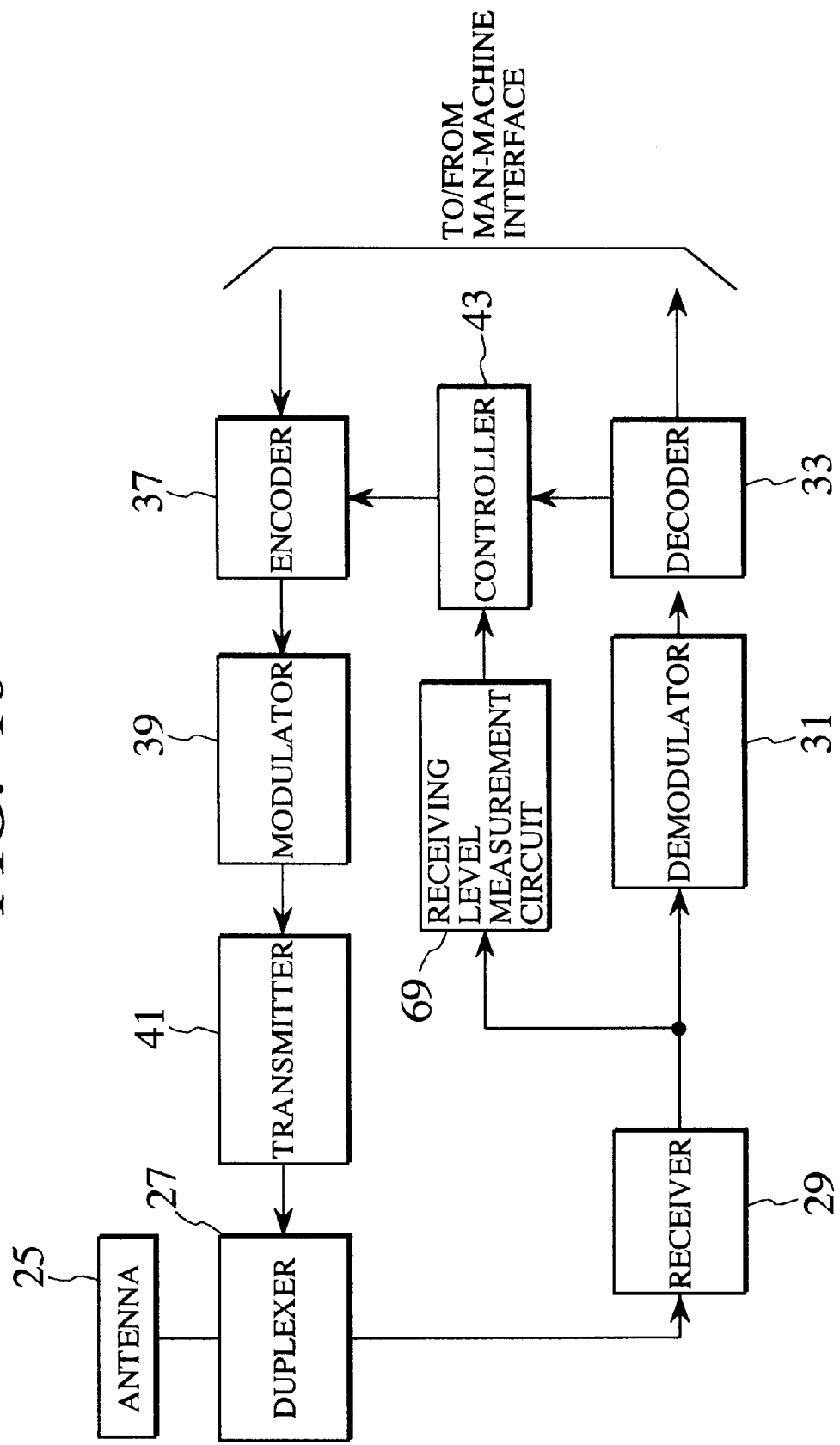
FIG. 10 is a block diagram of a mobile station apparatus in the eighth embodiment of a scheme for wire line data transmission according to the present invention.

Referring now to FIG. 10, the eighth embodiment of a scheme for wire line data transmission in a mobile communication system according to the present invention will be described in detail.

FIG. 8 shows a configuration of a mobile station apparatus for realizing the wire line data transmission scheme in the eighth embodiment of the present invention. In this eighth embodiment, the measurement and the judgement of the radio state quality are carried out by the mobile station similarly as in the seventh embodiment, and this mobile station apparatus of FIG. 10 uses a desired signal receiving level as the radio state quality to be measured. To this end, this mobile station apparatus of FIG. 10 differs from the mobile station apparatus of FIG. 9 in that a receiving level measurement circuit 69 is incorporated while the error detection processing circuit 67 of FIG. 9 is omitted, and a function of the controller 43 is changed in relation to the incorporation of the receiving level measurement circuit 67.

The rest of the configuration and the operation of this mobile station apparatus of FIG. 10 are the same as those of FIG. 9.

Also, in this eighth embodiment, the configuration of the mobile station apparatus is the same as that of FIG. 8. Here, the error detection bit attaching circuit 65 may be provided as in FIG. 8, even though it is not utilized in this eighth embodiment. Also, in this eighth embodiment, the configuration of the composition station apparatus is the same as that of FIG. 5.

In the mobile station apparatus of FIG. 10, the receiving level measurement circuit 69 measures the receiving level of each one of the radio channels received from a plurality of base stations which are simultaneously connected with this mobile station at a time of the soft handover. Then, the controller 43 compares each measured value with a prescribed value, and when there is a radio channel for which the measured value is less than the prescribed value, the controller 43 judges that the transmission signals for that radio channel are not to be transmitted to the wire line transmission path, and transmits this judgement result to the base station.

When this judgement result is received, the controller 23 of the base station generates a control signal for commanding the composition station to stop the transmission to the wire line transmission path for the downward transmission signals which are corresponding to the transmission signals for that radio channel, and transmits this control signal to the composition station via the wire line transmitter 13.

When this control signal is received, the controller 57 of the composition station commands the transmitter 55 to stop the transmission of the downward transmission signals via the downlink wire line transmission path, so that the transmission of the downward transmission signals is stopped.

Also, in the mobile station apparatus of FIG. 10, the receiving level measurement circuit 69 measures the receiving level of each one of a plurality of radio channels, and the controller 43 compares each measured value with another prescribed value. Then, when there is a radio channel for which the measured value is greatest among a plurality of measured values and which is greater than that another prescribed value, the controller 43 judges that the transmission signals for that radio channel alone are to be transmitted to the wire line transmission path while the transmission signals for all the other radio channels are not to be transmitted to the wire line transmission path, and transmits this judgement result to the base station.

In addition, in the mobile station apparatus of FIG. 10, the receiving level measurement circuit 68 measures the receiving level of each one of a plurality of radio channels, and the controller 43 compares each measured values with a set of prescribed values as follows. Namely, when there is a radio channel for which the measured value is greater than a first prescribed value X among the plurality of radio channels, the controller 43 judges that the transmission in the wire line transmission path for the transmission signals of those radio channels for which the measured value is less than a second prescribed value Y is to be stopped, where the second prescribed value Y is less than the first prescribed value X. Also, when there is no radio channel for which the measured value is greater than the first prescribed value X, the controller 43 judges that the transmission in the wire line transmission path for the transmission signals of those radio channels for which the measured value is less than a third prescribed value Z is to be stopped, where the third prescribed value Z is less than the second prescribed value Y.

Here, the second and third prescribed values Y and Z are set to such values that the transmission of the transmission signals for the other radio channels is easier to stop in a case where there is a radio channel for which the measured value is better than the first prescribed value X compared with a case where there is no radio channel for which the measured value is better than the first prescribed value X, so that it becomes easier to stop the transmission in the wire line transmission path when there is a radio channel for which the measured value is better than the first prescribed value X, while it becomes harder to stop the transmission in the wire line transmission path when there is no radio channel for which the measured value is better than the first prescribed value X.

Note here that the first, second and third prescribed values X, Y and Z used in this eighth embodiments are in general different from the first, second and third prescribed values used in the sixth embodiment described above.

Note also that the operation of this eighth embodiment has been described in terms of the receiving levels, but it is also effective to use the error detection results and the receiving SIR values instead of the receiving levels in the operation as described above.

Moreover, in a case of using the receiving SIR value which is a ratio of the desired signal receiving level and the interference receiving level, instead of the desired signal receiving level measured by the receiving level measurement circuit 69 in the mobile station apparatus of FIG. 10, it becomes possible to realize the transmission control in the wire line transmission path using the receiving SIR values similarly as described above.

Figure 11:
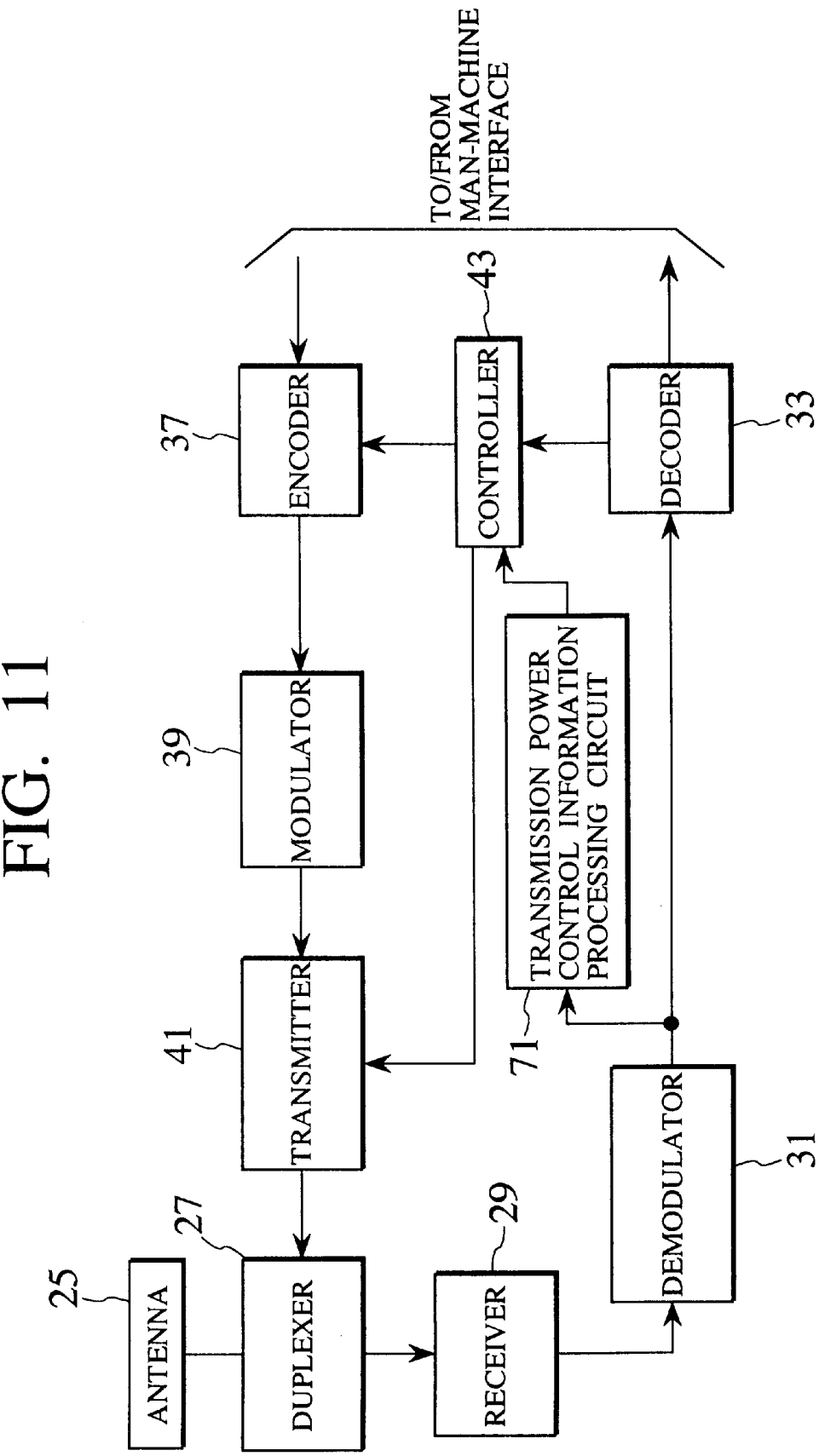
FIG. 11 is a block diagram of a mobile station apparatus in the ninth embodiment of a scheme for wire line data transmission according to the present invention.

Referring now to FIG. 11, the ninth embodiment of a scheme for wire line data transmission in a mobile communication system according to the present invention will be described in detail.

FIG. 11 shows a configuration of a mobile station apparatus for realizing the wire line data transmission scheme in the ninth embodiment of the present invention. In this ninth embodiment, the measurement and the judgement of the radio state quality are carried out by the mobile station similarly as in the seventh and eight embodiments, and this mobile station apparatus of FIG. 11 uses a transmission power changing command frequency in the transmission power control information as the radio state quality to be measured. To this end, this mobile station apparatus of FIG. 11 differs from the mobile station apparatus of FIG. 10 in that a transmission power control information processing circuit 71 is incorporated while the receiving level measurement circuit 69 of FIG. 10 is omitted, and a function of the controller 43 is changed in relation to the incorporation of the transmission power control information processing circuit 71. The rest of the configuration and the operation of this mobile station apparatus of FIG. 11 are the same as those of FIG. 10.

Also, in this ninth embodiment, the configuration of the base station apparatus is the same as that of FIG. 8. Here, the error detection bit attaching circuit 35 may be provided as in FIG. 8, even though it is not utilized in this ninth embodiment. Also, in this ninth embodiment, the configuration of the composition station apparatus is the same as that of FIG. 5.

In the mobile station apparatus of FIG. 11, the transmission power control information processing circuit 71 extracts the transmission power control information from the downward radio channel signals demodulated by the demodulator 31, and supplies the extracted transmission power control information to the controller 43.

Then, the controller 43 specifies the transmission power value to the transmitter 41 according to the transmission power control information received from the transmission power control information processing circuit 71, while measuring a frequency for which the transmission power control information commands the raise of the transmission power, that is, the transmission power raising command frequency, and when this measured value is greater than a prescribed value, that is, in a case where a command to raise the transmission power because of the low receiving level is issued frequently, it implies that the radio state quality is poor, so that the controller 43 judges that the transmission of the transmission signals to the wire line transmission path is to be stopped, and notifies this judgement result to the base station.

When this judgement result is received, the controller 23 of the base station generates a control signal for commanding the composition station to stop the transmission of the transmission signals to the wire line transmission path, and transmits this control signal to the composition station via the wire line transmitter 13.

Thereafter, when the measured value of the transmission power changing command frequency becomes not greater than a prescribed value, the controller 43 judges that the transmission of the transmission signals to the wire line transmission path is to be restarted, and transmits this judgement result to the base station.

Also, in the mobile station apparatus of FIG. 11, the transmission power control information processing circuit 71 measures the transmission power lowering command frequency in the transmission power control for each one of a plurality of radio channels, and the controller 43 compares each measured value with a set of prescribed values as follows. Namely, when there is a radio channel for which the measured value is greater than a first prescribed value X among the plurality of radio channels, the controller 43 judges that the transmission in the wire line transmission path for the transmission signals of those radio channels for which the measured value is less than a second prescribed value Y is to be stopped, where the second prescribed value Y is less than the first prescribed value X. Also, when there is no radio channel for which the measured value is greater than the first prescribed value X, the controller 43 judges that the transmission in the wire line transmission path for the transmission signals of those radio channels for which the measured value is less than a third prescribed value Z is to be stopped, where the third prescribed value Z is less than the second prescribed value Y.

In addition, in the mobile station apparatus of FIG. 11, the transmission power control information processing circuit 71 measures the transmission power raising command frequency in the transmission power control for each one of a plurality of radio channels, and the controller 43 compares each measured value with another set of prescribed values as follows. Namely, when there is a radio channel for which the measured value is less than a first prescribed value U among the plurality of radio channels, the controller 43 judges that the transmission in the wire line transmission path for the transmission signals of those radio channels for which the measured value is greater than a second prescribed value V is to be stopped, where the second prescribed value V is greater than the first prescribed value U. Also, when there is no radio channel for which the measured value is less than the first prescribed value U, the controller 43 judges that the transmission in the wire line transmission path for the transmission signals of those radio channels for which the measured value is greater than a third prescribed value W is to be stopped, where the third prescribed value W is greater than the second prescribed value V.

In this manner, it becomes easier to stop the transmission in the wire line transmission path when there is a radio channel for which the measured value is better than the first prescribed value X or U, while it becomes harder to stop the transmission in the wire line transmission path when there is no radio channel for which the measured value is better than the first prescribed value X or U.

Note here that the first, second and third prescribed values X, Y and Z used in a case of using the transmission power lowering command frequency are not necessarily the same as the first, second and third prescribed values U, V and W used in a case of using the transmission power raising command frequency.

Note also that the first, second and third prescribed values X, Y and Z or U, V and W used in this ninth embodiments are in general different from the first, second and third prescribed values used in the sixth embodiment or the eighth embodiment described above.

Next, the tenth embodiment of a scheme for wire line data transmission in a mobile communication system according to the present invention will be described in detail.

In this tenth embodiment, only the measurement of the radio state quality is carried out by the mobile station, and the measured value is transmitted to the base station, so that the judgement of the radio state quality can be made at the base station.

Here, in a case of using the error detection result as the radio state quality to be measured similarly as in the seventh embodiment, the configurations of the base station apparatus and the mobile station apparatus are the same as those of FIG. 8 and FIG. 9. Also, in this tenth embodiment, the configuration of the composition station apparatus is the same as that of FIG. 5.

In this tenth embodiment, the mobile station carries out the error detection for each radio channel at the error detection processing circuit 67, and transmits the error detection results for respective radio channels as obtained to the base stations corresponding to the respective radio channels, or transmits the error detection results for all radio channels to each base station. The base station makes the judgement based on this error detection result, commands the wire line transmitter 13 to stop or restart the transmission of the transmission signals to the wire line transmission path according to the judgement result, and notifies the stopping or the restart of the transmission of the transmission signals to the wire line transmission path to the composition station via the wire line transmission path. Here, the notification to the composition station can be made either when each judgement result is obtained, or only when the judgement result is changed.

Also, in a case of using the desired signal receiving level as the radio state quality to be measured instead of the error detection result similarly as in the eighth embodiment, the configuration of the mobile station apparatus is the same as that of FIG. 10. Here, the overall operation is substantially the same as in the eighth embodiment, except that only the measurement is carried out at the mobile station, and the measured values for respective radio channels are transmitted to the base stations corresponding to the respective radio channels or the measured values for all radio channels are transmitted to each base station, so that the judgement is to be made at the base station. In this case, it is also possible to measure the receiving SIR value instead of the desired signal receiving level.

Also, in a case of using the transmission power changing command frequency in the transmission power control information as the radio state quality to be measured similarly as in the ninth embodiment, the configuration of the mobile station apparatus is the same as that of FIG. 11. Here, the overall operation is substantially the same as in the ninth embodiment, except that only the measurement is carried out at the mobile station, and the measured values for respective radio channels are transmitted to the base stations corresponding to the respective radio channels or the measured values for all radio channels are transmitted to each base station, so that the judgement is to be made at the base station.

As described, according to the present invention, the wire line transmission path is formed by the packet transmission path while the radio state qualities of a plurality of radio channels are measured, and then the redundancy in composition and the validity are judged for each radio channel according to the measured values, and the transmission in the wire line transmission path of the transmission signals for the radio channels which are judged as redundant or invalid is stopped, so that it is possible to reduce the wire line transmission cost at a time of the soft handover.

Also, according to the present invention, any one or more of the error detection result, the desired signal receiving level, the receiving SIR value, and the transmission power changing command frequency in the transmission power control can be used as the radio state quality to be measured, so that it is possible to selectively use the radio state quality which is suitable for the various required conditions.

Also, according to the present invention, it is possible to carry out both the measurement and the judgement of the radio state quality at the base station or at the mobile station, or to carry out the measurement at the mobile station and the judgement at the base station, so that it is possible to use a desired combination of the mobile station apparatus and the base station apparatus according to the required conditions of the system.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of wire line data transmission in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; and a plurality of transmission signals from the plurality of base stations to the mobile station are composed at the mobile station; the method comprising the steps of:

measuring radio state qualities of a plurality of radio channels between the plurality of base stations and the mobile station;

judging a validity and a redundancy in composition of each radio channel according to a corresponding radio state quality measured at the measuring step; and controlling a transmission in the wire line transmission paths by stopping a transmission of transmission signals for those radio channels which are judged as invalid or redundant according to a judgement result obtained at the judging step.

2. The method of claim 1, further comprising the step of:

providing the plurality of wire line transmission paths in forms of packet transmission paths, so that the controlling step controls a transmission of transmission signals in the packet transmission paths.

3. The method of claim 1, wherein a series of processing including the measuring step, the judging step, and the controlling step is carried out for each data unit used in composing transmission signals.

4. The method of claim 1, wherein the judging step judges a validity and a redundancy in composition for upward transmission signals from the mobile station to each base station according to a corresponding radio state quality measured at the measuring step, and the controlling step controls a transmission in one uplink wire line transmission path from said each base station to the composition station according to the judgement result obtained at the judging step.

5. The method of claim 4, further comprising the steps of:

stopping a transmission in one downlink wire line transmission path from the composition station to said each base station at the composition station, when a state of not being able to receive transmission signals from said one uplink wire line transmission path is continued over a prescribed period of time at the composition station; and restarting a transmission in said one downlink wire line transmission path at the composition station after being stopped by the stopping step, when a state of receiving transmission signals from said one uplink wire line transmission path is continued over a prescribed period of time at the composition station.

6. The method of claim 1, wherein the judging step judges a validity and a redundancy in composition for downward transmission signals from each base station to the mobile station according to a corresponding radio state quality measured at the measuring step, and the controlling step controls a transmission in one downlink wire line transmission path from the composition station to said each base station according to the judgement result obtained at the judging step.

7. The method of claim 6, further comprising the step of:

notifying an information on the judgement result obtained at the judging step to the composition station whenever the judgement result is obtained by the judging step, so that the composition station controls a transmission in said one downlink wire line transmission path at the controlling step according to said information.

8. The method of claim 6, further comprising the step of:

notifying an information on the judgement result obtained at the judging step to the composition station only when the judgement result obtained at the judging step is changed, so that the composition station controls a transmission in said one downlink wire line transmission path at the controlling step according to said information.

9. The method of claim 1, wherein the judging step judges that a transmission in the wire line transmission paths of transmission signals for one radio channel is to be stopped when a measured radio state quality of said one radio channel becomes lower than a prescribed value or when the measured radio state quality of said one radio channel becomes continuously lower than the prescribed value over a prescribed period of time.

10. The method of claim 1, wherein the judging step judges that a transmission in the wire line transmission paths of transmission signals for one radio channel is to be restarted after being stopped by the controlling step, when a measured radio state quality of said one radio channel becomes higher than a prescribed value or when the measured radio state quality of said one radio channel becomes continuously higher than the prescribed value over the prescribed period of time.

11. The method of claim 1, wherein the measuring step measures a radio state quality of each radio channel by measuring any one or more of an error detection result, a desired signal receiving level, a receiving SIR value, a transmission power raising command frequency in a transmission power control and a transmission power lowering command frequency in a transmission power control, for said each radio channel.

12. The method of claim 1, wherein the measuring step measures the radio state qualities of the plurality of radio channels by measuring transmission power lowering command frequencies in a transmission power control for respective radio channels, when there is a radio channel for which a measured value of a radio state quality is higher than a first prescribed value, the judging step judges that a transmission in the wire line transmission paths of transmission signals for those radio channels for which a measured value of a radio state quality is lower than a second prescribed value is to be stopped, where the second prescribed value is lower than the first prescribed value; and when there is no radio channel for which a measured value of a radio state quality is higher than the first prescribed value, the judging step judges that a transmission in the wire line transmission paths of transmission signals for those radio channels for which a measured value of a radio state quality is lower than a third prescribed value is to be stopped, where the third prescribed value is lower than the second prescribed value.

13. The method of claim 1, wherein the measuring step measures the radio state qualities of the plurality of radio channels by measuring transmission power raising command frequencies in a transmission power control for respective radio channels, when there is a radio channel for which a measured value of a radio state quality is lower than a first prescribed value, the judging step judges that a transmission in the wire line transmission paths of transmission signals for those radio channels for which a measured value of a radio state quality is higher than a second prescribed value is to be stopped, where the second prescribed value is higher than the first prescribed value; and when there is no radio channel for which a measured value of a radio state quality is lower than the first prescribed value, the judging step judges that a transmission in the wire line transmission paths of transmission signals for those radio channels for which a measured value of a radio state quality is higher than a third prescribed value is to be stopped, where the third prescribed value is higher than the second prescribed value.

14. The method of claim 1, wherein when there is one radio channel for which a measured value of a radio state quality is best among the plurality of radio channels and better than a prescribed value, the judging step judges that transmission signals for said one radio channel alone are to be transmitted in the wire line transmission paths and a transmission in the wire line transmission paths of transmission signals for all other radio channels is to be stopped.

15. The method of claim 1, wherein when there is a radio channel for which a measured value of a radio state quality is better than a first prescribed value, the judging step judges that a transmission in the wire line transmission paths of transmission signals for those radio channels for which a measured value of a radio state quality is not better than a second prescribed value is to be stopped, where the second prescribed value is lower than the first prescribed value; and when there is no radio channel for which a measured value of a radio state quality is lower than the first prescribed value, the judging step judges that a transmission in the wire line transmission paths of transmission signals for those radio channels for which a measured value of a radio state quality is not better than a third prescribed value is to be stopped, where the third prescribed value is lower than the second prescribed value.

16. The method of claim 1, wherein each base station measures a radio state quality of one radio channel between said each base station and the mobile station at the measuring step;

said each base station judges a validity and a redundancy in composition of said one radio channel at the judging step according to the radio state quality measured by said each base station at the measuring step; and said each base station controls a transmission in the wire line transmission paths by stopping a transmission of transmission signals for said one radio channel at the controlling step, when said one radio channel is judged as invalid or redundant according to the judgement result obtained by said each base station at the judging step.

17. The method of claim 1, wherein the mobile station measures the radio state qualities of a plurality of radio channels between the plurality of base stations and the mobile station at the measuring step;

the mobile station judges a validity and a redundancy in composition of each radio channel at the judging step according to a corresponding radio state quality measured by the mobile station at the measuring step;

the mobile station notifies the judgement result obtained by the mobile station at the judging step to each base station; and said each base station controls a transmission in the wire line transmission paths by stopping a transmission of transmission signals for one radio channel between said each base station and the mobile station at the controlling step, when said one radio channel is judged as invalid or redundant by the mobile station according to the judgement result notified from the mobile station to said each base station.

18. The method of claim 1, wherein the mobile station measures the radio state qualities of a plurality of radio channels between the plurality of base stations and the mobile station at the measuring step;

the mobile station notifies a radio state quality for one radio channel between each base station and the mobile station obtained by the mobile station at the measuring step to said each base station;

said each base station judges a validity and a redundancy in composition of said one radio channel at the judging step according to the radio state quality notified from the mobile station to said each base station; and said each base station controls a transmission in the wire line transmission paths by stopping a transmission of transmission signals for one radio channel between said each base station and the mobile station at the controlling step, when said one radio channel is judged as invalid or redundant according to the judgement result obtained by said each base station at the judging step.

19. The method of claim 18, wherein the mobile station notifies all the radio state qualities for the plurality of radio channels between the plurality of base stations and the mobile station obtained by the mobile station at the measuring step to said each base station, so that said each base station judges a validity and a redundancy in composition of said one radio channel according to all the radio state qualities notified from the mobile station.

20. A base station apparatus for use in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; and a plurality of transmission signals from the plurality of base stations to the mobile station are composed at the mobile station; the base station apparatus comprising:
   a measurement circuit for measuring a radio state quality of one radio channel between the base station apparatus and the mobile station;
   a wire line transmission circuit for transmitting transmission signals for said one radio channel to the composition station, through one wire line transmission circuit between the base station apparatus and the composition station; and
   a control circuit for judging a validity and a redundancy in composition of said one radio channel according to the radio state quality measured by the measurement circuit, and controlling a transmission in said one wire line transmission path from the wire line transmission circuit by stopping a transmission of transmission signals for said one radio channel when said one radio channel is judged as invalid or redundant according to a judgement result obtained therein.

21. The base station apparatus of claim 20, wherein the plurality of wire line transmission paths are provided in forms of packet transmission paths, so that the control circuit controls a transmission of transmission signals in the packet transmission paths.

22. The base station apparatus of claim 20, wherein a series of processing including measuring by the measurement circuit, judging by the control circuit, and controlling by the control circuit is carried out by the base station apparatus for each data unit used in composing transmission signals.

23. The base station apparatus of claim 20, wherein the control circuit judges a validity and a redundancy in composition for upward transmission signals from the mobile station to the base station apparatus according to the radio state quality measured by the measurement circuit, and controls a transmission in one uplink wire line transmission path from the base station apparatus to the composition station according to the judgement result.

24. The base station apparatus of claim 23, wherein controlling by the control circuit indirectly controls the composition station such that
   the composition station stops a transmission in one downlink wire line transmission path from the composition station to the base station apparatus, when a state of not being able to receive transmission signals from said one uplink wire line transmission path is continued over a prescribed period of time at the composition station; and
   the composition station restarts a transmission in said one downlink wire line transmission path after being stopped, when a state of receiving transmission signals from said one uplink wire line transmission path is continued over a prescribed period of time at the composition station.

25. The base station apparatus of claim 20, wherein the control circuit judges a validity and a redundancy in composition for downward transmission signals from the base station apparatus to the mobile station according to the radio state quality measured by the measurement circuit, and controls a transmission in one downlink wire line transmission path from the composition station to the base station apparatus according to the judgement result.

26. The base station apparatus of claim 25, wherein the control circuit notifies an information on the judgement result to the composition station whenever the judgement result is obtained, so that the composition station controls a transmission in said one downlink wire line transmission path according to said information.

27. The base station apparatus of claim 25, wherein the control circuit notifies an information on the judgement result to the composition station only when the judgement result is changed, so that the composition station controls a transmission in said one downlink wire line transmission path according to said information.

28. The base station apparatus of claim 20, wherein the control circuit judges that a transmission in the wire line transmission paths of transmission signals for said one radio channel is to be stopped when the radio state quality measured by the measurement circuit becomes lower than a prescribed value or when the radio state quality measured by the measurement circuit becomes continuously lower than the prescribed value over a prescribed period of time.

29. The base station apparatus of claim 20, wherein the control circuit judges that a transmission in the wire line transmission paths of transmission signals for said one radio channel is to be restarted after being stopped, when the radio state quality measured by the measurement circuit becomes higher than a prescribed value or when the radio state quality measured by the measurement circuit becomes continuously higher than the prescribed value over the prescribed period of time.

30. The base station apparatus of claim 20, wherein the measurement circuit measures the radio state quality of said one radio channel by measuring any one or more of an error detection result, a desired signal receiving level, a receiving SIR value, a transmission power raising command frequency in a transmission power control and a transmission power lowering command frequency in a transmission power control, for said one radio channel.

31. A mobile station apparatus for use in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; a plurality of transmission signals from the plurality of base stations to the mobile station are composed at the mobile station; and each base station transmits transmission signals for one radio channel between said each base station and the mobile station to the composition station through one wire line transmission circuit between said each base station and the composition station; the mobile station apparatus comprising:

a measurement circuit for measuring radio state qualities of a plurality of radio channels between the plurality of base stations and the mobile station;

a control circuit for judging a validity and a redundancy in composition of each radio channel according to a corresponding radio state quality measured by the measurement circuit; and a transmission circuit for notifying a judgement result obtained by the control circuit to each base station, so that each base station controls a transmission in said one wire line transmission path by stopping a transmission of transmission signals for said one radio channel when said one radio channel is judged as invalid or redundant according to the judgement result obtained by the control circuit.

32. The mobile station apparatus of claim 31, wherein the plurality of wire line transmission paths are provided in forms of packet transmission paths, so that the judgement result obtained by the control circuit indirectly controls a transmission of transmission signals in the packet transmission paths.

33. The mobile station apparatus of claim 31, wherein a series of processing including measurement by the measurement circuit and judging by the control circuit is carried out by the mobile station apparatus for each data unit used in composing transmission signals.

34. The mobile station apparatus of claim 31, wherein the control circuit judges a validity and a redundancy in composition for upward transmission signals from the mobile station to said each base station according to a corresponding radio state quality measured by the measurement circuit, so that said each base station controls a transmission in one uplink wire line transmission path from said each base station to the composition station according to the judgement result obtained by the control circuit.

35. The mobile station apparatus of claim 34, wherein the judgement result obtained by the control circuit indirectly controls the composition station such that the composition station stops a transmission in one downlink wire line transmission path from the composition station to said each base station, when a state of not being able to receive transmission signals from said one uplink wire line transmission path is continued over a prescribed period of time at the composition station; and the composition station restarts a transmission in said one downlink wire line transmission path after being stopped, when a state of receiving transmission signals from said one uplink wire line transmission path is continued over a prescribed period of time at the composition station.

36. The mobile station apparatus of claim 31, wherein the control circuit judges a validity and a redundancy in composition for downward transmission signals from said each base station to the mobile station according to a corresponding radio state quality measured by the measurement circuit, so that the base station controls a transmission in one downlink wire line transmission path from the composition station to said each base station according to the judgement result obtained by the control circuit.

37. The mobile station apparatus of claim 31, wherein the control circuit judges that a transmission in the wire line transmission paths of transmission signals for said one radio channel is to be stopped when a measured radio state quality of said one radio channel becomes lower than a prescribed value or when the measured radio state quality of said one radio channel becomes continuously lower than the prescribed value over a prescribed period of time.

38. The mobile station apparatus of claim 31, wherein the control circuit judges that a transmission in the wire line transmission paths of transmission signals for said one radio channel is to be restarted after being stopped, when a measured radio state quality of said one radio channel becomes higher than a prescribed value or when the measured radio state quality of said one radio channel becomes continuously higher than the prescribed value over the prescribed period of time.

39. The mobile station apparatus of claim 31, wherein the measurement circuit measures a radio state quality of each radio channel by measuring any one or more of an error detection result, a desired signal receiving level, a receiving SIR value, a transmission power raising command frequency in a transmission power control and a transmission power lowering command frequency in a transmission power control, for said each radio channel.

40. The mobile station apparatus of claim 31, wherein the measurement circuit measures the radio state qualities of the plurality of radio channels by measuring transmission power lowering command frequencies in a transmission power control for respective radio channels, when there is a radio channel for which a measured value of a radio state quality is higher than a first prescribed value, the control circuit judges that a transmission in the wire line transmission paths of transmission signals for those radio channels for which a measured value of a radio state quality is lower than a second prescribed value is to be stopped, where the second prescribed value is lower than the first prescribed value; and when there is no radio channel for which a measured value of a radio state quality is higher than the first prescribed value, the control circuit judges that a transmission in the wire line transmission paths of transmission signals for those radio channels for which a measured value of a radio state quality is lower than a third prescribed value is to be stopped, where the third prescribed value is lower than the second prescribed value.

41. The mobile station apparatus of claim 31, wherein the measurement circuit measures the radio state qualities of the plurality of radio channels by measuring transmission power raising command frequencies in a transmission power control for respective radio channels, when there is a radio channel for which a measured value of a radio state quality is lower than a first prescribed value, the control circuit judges that a transmission in the wire line transmission paths of transmission signals for those radio channels for which a measured value of a radio state quality is higher than a second prescribed value is to be stopped, where the second prescribed value is higher than the first prescribed value; and when there is no radio channel for which a measured value of a radio state quality is lower than the first prescribed value, the control circuit judges that a transmission in the wire line transmission paths of transmission signals for those radio channels for which a measured value of a radio state quality is higher than a third prescribed value is to be stopped, where the third prescribed value is higher than the second prescribed value.

42. The mobile station apparatus of claim 31, wherein when there is a certain radio channel for which a measured value of a radio state quality is best among the plurality of radio channels and better than a prescribed value, the control circuit judges that transmission signals for said certain radio channel alone are to be transmitted in the wire line transmission paths and a transmission in the wire line transmission paths of transmission signals for all other radio channels is to be stopped.

43. The mobile station apparatus of claim 31, wherein when there is a radio channel for which a measured value of a radio state quality is better than a first prescribed value, the control circuit judges that a transmission in the wire line transmission paths of transmission signals for those radio channels for which a measured value of a radio state quality is not better than a second prescribed value is to be stopped, where the second prescribed value is lower than the first prescribed value; and when there is no radio channel for which a measured value of a radio state quality is lower than the first prescribed value, the control circuit judges that a transmission in the wire line transmission paths of transmission signals for those radio channels for which a measured value of a radio state quality is not better than a third prescribed value is to be stopped, where the third prescribed value is lower than the second prescribed value.

44. A base station apparatus for use in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; a plurality of transmission signals from the plurality of base stations to the mobile station are composed at the mobile station; and the mobile station measures radio state qualities of a plurality of radio channels between the plurality of base stations and the mobile station, judges a validity and a redundancy in composition of each radio channel according to a corresponding measured radio state quality, and notifies a judgement result obtained therein to each base station; the base station apparatus comprising:

a wire line transmission circuit for transmitting transmission signals for one radio channel between the base station apparatus and the mobile station to the composition station through one wire line transmission circuit between the base station apparatus and the composition station; and a control circuit for controlling a transmission in said one wire line transmission path from the wire line transmission circuit by stopping a transmission of transmission signals for said one radio channel when said one radio channel is judged as invalid or redundant according to the judgement result notified from the mobile station.

45. The base station apparatus of claim 44, wherein the plurality of wire line transmission paths are provided in forms of packet transmission paths, so that the control circuit controls a transmission of transmission signals in the packet transmission paths.

46. The base station apparatus of claim 44, wherein a series of processing including controlling by the control circuit is carried out by the base station apparatus for each data unit used in composing transmission signals.

47. The base station apparatus of claim 44, wherein the judgement result notified from the mobile station is obtained by judging a validity and a redundancy in composition for upward transmission signals from the mobile station to the base station apparatus according to a corresponding measured radio state quality, so that the control circuit controls a transmission in one uplink wire line transmission path from the base station apparatus to the composition station according to the judgement result notified from the mobile station.

48. The base station apparatus of claim 47, wherein controlling by the control circuit indirectly controls the composition station such that the composition station stops a transmission in one downlink wire line transmission path from the composition station to the base station apparatus, when a state of not being able to receive transmission signals from said one uplink wire line transmission path is continued over a prescribed period of time at the composition station; and the composition station restarts a transmission in said one downlink wire line transmission path after being stopped, when a state of receiving transmission signals from said one uplink wire line transmission path is continued over a prescribed period of time at the composition station.

49. The base station apparatus of claim 44, wherein the judgement result notified from the mobile station is obtained by judging a validity and a redundancy in composition for downward transmission signals from the base station apparatus to the mobile station according to a corresponding measured radio state quality, so that the control circuit controls a transmission in one downlink wire line transmission path from the composition station to the base station apparatus according to the judgement result notified from the mobile station.

50. The base station apparatus of claim 49, wherein the wire line transmission circuit notifies an information on the judgement result notified from the mobile station to the composition station whenever the judgement result is notified from the mobile station, so that the composition station controls a transmission in said one downlink wire line transmission path according to said information.

51. The base station apparatus of claim 49, wherein the wire line transmission circuit notifies an information on the judgement result notified from the mobile station to the composition station only when the judgement result notified from the mobile station is changed, so that the composition station controls a transmission in said one downlink wire line transmission path according to said information.

52. A base station apparatus for use in a mobile communication system based on a CDMA scheme in which a mobile station moving between cells is simultaneously connected with a plurality of base stations; the plurality of base stations are connected with a composition station through a plurality of wire line transmission paths; a plurality of transmission signals from the plurality of mobile stations to the composition station are composed at the composition station; a plurality of transmission signals from the plurality of base stations to the mobile station are composed at the mobile station; and the mobile station measures radio state qualities of a plurality of radio channels between the plurality of base stations and the mobile station and notifies a measured radio state quality of a radio channel between each base station and the mobile station to each base station; the base station apparatus comprising:

a wire line transmission circuit for transmitting transmission signals for one radio channel between the base station apparatus and the mobile station to the composition station, through one wire line transmission circuit between the base station apparatus and the composition station; and a control circuit for judging a validity and a redundancy in composition of said one radio channel according to the radio state quality notified from the mobile station, and controlling a transmission in said one wire line transmission path from the wire line transmission circuit by stopping a transmission of transmission signals for said one radio channel when said one radio channel is judged as invalid or redundant according to a judgement result obtained therein.

53. The base station apparatus of claim 52, wherein the plurality of wire line transmission paths are provided in forms of packet transmission paths, so that the control circuit controls a transmission of transmission signals in the packet transmission paths.

54. The base station apparatus of claim 52, wherein a series of processing including judging by the control circuit and controlling by the control circuit is carried out by the base station apparatus for each data unit used in composing transmission signals.

55. The base station apparatus of claim 52, wherein the control circuit judges a validity and a redundancy in composition for upward transmission signals from the mobile station to the base station apparatus according to the radio state quality notified from the mobile station, and the control circuit controls a transmission in one uplink wire line transmission path from the base station apparatus to the composition station according to the judgement result.

56. The base station apparatus of claim 55, wherein controlling by the control circuit indirectly controls the composition station such that the composition station stops a transmission in one downlink wire line transmission path from the composition station to the base station apparatus, when a state of not being able to receive transmission signals from said one uplink wire line transmission path is continued over a prescribed period of time at the composition station; and the composition station restarts a transmission in said one downlink wire line transmission path after being stopped, when a state of receiving transmission signals from said one uplink wire line transmission path is continued over a prescribed period of time at the composition station.

57. The base station apparatus of claim 52, wherein the control circuit judges a validity and a redundancy in composition for downward transmission signals from the base station apparatus to the mobile station according to the radio state quality notified from the mobile station, and the control circuit controls a transmission in one downlink wire line transmission path from the composition station to the base station apparatus according to the judgement result.

58. The base station apparatus of claim 57, wherein the wire line transmission circuit notifies an information on the judgement result obtained by the control circuit to the composition station whenever the judgement result is obtained by the control circuit, so that the composition station controls a transmission in said one downlink wire line transmission path according to said information.

59. The base station apparatus of claim 57, wherein the wire line transmission circuit notifies an information on the judgement result obtained by the control circuit to the composition station only when the judgement result obtained by the control circuit is changed, so that the composition station controls a transmission in said one downlink wire line transmission path according to said information.

60. The base station apparatus of claim 52, wherein the control circuit judges that a transmission in the wire line transmission paths of transmission signals for said one radio channel is to be stopped when a measured radio state quality of said one radio channel notified from the mobile station becomes lower than a prescribed value or when the measured radio state quality of said one radio channel becomes continuously lower than the prescribed value over a prescribed period of time.

61. The base station apparatus of claim 52, wherein the control circuit judges that a transmission in the wire line transmission paths of transmission signals for said one radio channel is to be restarted after being stopped, when a measured radio state quality of said one radio channel notified from the mobile station becomes higher than a prescribed value or when the measured radio state quality of said one radio channel becomes continuously higher than the prescribed value over the prescribed period of time.

62. The base station apparatus of claim 52, wherein the measured radio state quality notified from the mobile station is given in terms of any one or more of an error detection result, a desired signal receiving level, a receiving SIR value, a transmission power raising command frequency in a transmission power control and a transmission power lowering command frequency in a transmission power control, for said each radio channel.

63. The base station apparatus of claim 52, wherein the mobile station notifies all measured radio state qualities for the plurality of radio channels between the plurality of base stations and the mobile station, so that the control circuit judges a validity and a redundancy in composition of said one radio channel according to all the measured radio state qualities notified from the mobile station.

64. The base station apparatus of claim 63, wherein the measured radio state qualities notified from the mobile station are given in terms of transmission power lowering command frequencies in a transmission power control for respective radio channels, when there is a radio channel for which a measured value of a radio state quality is higher than a first prescribed value, the control circuit judges that a transmission in the wire line transmission paths of transmission signals for those radio channels for which a measured value of a radio state quality is lower than a second prescribed value is to be stopped, where the second prescribed value is lower than the first prescribed value; and when there is no radio channel for which a measured value of a radio state quality is higher than the first prescribed value, the control circuit judges that a transmission in the wire line transmission paths of transmission signals for those radio channels for which a measured value of a radio state quality is lower than a third prescribed value is to be stopped, where the third prescribed value is lower than the second prescribed value.

65. The base station apparatus of claim 63, wherein the measured radio state qualities notified from the mobile station are given in terms of transmission power raising command frequencies in a transmission power control for respective radio channels, when there is a radio channel for which a measured value of a radio state quality is lower than a first prescribed value, the control circuit judges that a transmission in the wire line transmission paths of transmission signals for those radio channels for which a measured value of a radio state quality is higher than a second prescribed value is to be stopped, where the second prescribed value is higher than the first prescribed value; and when there is no radio channel for which a measured value of a radio state quality is lower than the first prescribed value, the control circuit judges that a transmission in the wire line transmission paths of transmission signals for those radio channels for which a measured value of a radio state quality is higher than a third prescribed value is to be stopped, where the third prescribed value is higher than the second prescribed value.

66. The base station apparatus of claim 63, wherein when there is a certain radio channel for which a measured value of a radio state quality is best among the plurality of radio channels and better than a prescribed value, the control circuit judges that transmission signals for said certain radio channel alone are to be transmitted in the wire line transmission paths and a transmission in the wire line transmission paths of transmission signals for all other radio channels is to be stopped.

67. The base station apparatus of claim 63, wherein when there is a radio channel for which a measured value of a radio state quality is better than a first prescribed value, the control circuit judges that a transmission in the wire line transmission paths of transmission signals for those radio channels for which a measured value of a radio state quality is not better than a second prescribed value is to be stopped, where the second prescribed value is lower than the first prescribed value; and when there is no radio channel for which a measured value of a radio state quality is lower than the first prescribed value, the control circuit judges that a transmission in the wire line transmission paths of transmission signals for those radio channels for which a measured value of a radio state quality is not better than a third prescribed value is to be stopped, where the third prescribed value is lower than the second prescribed value.

* * * * *

UNITED STATES PATENT AND TRADEMARK OFFICE
CERTIFICATE OF CORRECTION

PATENT NO. : 6,122,265

DATED : September 19, 2000

INVENTOR(S): Takehiro NAKAMURA, et al.

It is certified that an error appears in the above-identified patent and that said Letters Patent is hereby corrected as shown below:

On the Title Page, the CPA information has been omitted. It should read as follows:

--[45] **Date of Patent: *Sep. 19, 2000** --

--[ * ] Notice: This patent issued on a continued prosecution application filed under 37 CFR 1.53(d), and is subject to the twenty year patent term provisions of 35 U.S.C. 154(a)(2). --

Signed and Sealed this

Fifteenth Day of May, 2001

Attest:

NICHOLAS P. GODICI

Attesting Officer

Acting Director of the United States Patent and Trademark Office